United States Patent
Chida et al.

(10) Patent No.: US 12,010,426 B2
(45) Date of Patent: Jun. 11, 2024

(54) CONTROL DEVICE AND METHOD

(71) Applicant: SONY CORPORATION, Tokyo (JP)

(72) Inventors: Keisuke Chida, Tokyo (JP); Takuro Kawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 680 days.

(21) Appl. No.: 17/252,888

(22) PCT Filed: Jun. 12, 2019

(86) PCT No.: PCT/JP2019/023232
§ 371 (c)(1),
(2) Date: Dec. 16, 2020

(87) PCT Pub. No.: WO2020/004029
PCT Pub. Date: Jan. 2, 2020

(65) Prior Publication Data
US 2021/0266464 A1    Aug. 26, 2021

(30) Foreign Application Priority Data

Jun. 26, 2018 (JP) ................................. 2018-120458

(51) Int. Cl.
*H04N 23/68* (2023.01)
*B64C 39/02* (2023.01)
(Continued)

(52) U.S. Cl.
CPC ......... *H04N 23/687* (2023.01); *B64C 39/024* (2013.01); *B64D 47/08* (2013.01); *G05D 1/0607* (2013.01); *B64U 2101/30* (2023.01); *B64U 2201/20* (2023.01)

(58) Field of Classification Search
CPC ....... B64C 13/18; B64C 39/024; B64D 47/08; B64U 10/13; B64U 2101/30;
(Continued)

(56) References Cited

U.S. PATENT DOCUMENTS 10,086,309 B2 * 10/2018 Yamada ................. B64C 39/024
11,592,838 B2 *  2/2023 Arwatz ..................... G01P 5/10
(Continued)

FOREIGN PATENT DOCUMENTS

CN         104717463 A      6/2015
CN         106412230 A      2/2017
(Continued)

OTHER PUBLICATIONS

First Office Action for CN Application No. 201980041166.9 dated May 27, 2022, 10 pages of translation and 7 pages of Office action.
International Search Report and Written Opinion of PCT Application No. PCT/JP2019/023232, dated Sep. 3, 2019, 07 pages of ISRWO.

*Primary Examiner* — Amy R Hsu
(74) *Attorney, Agent, or Firm* — CHIP LAW GROUP

(57) ABSTRACT

The present technique relates to a control device and method and a program for enabling image capturing under optimum image-capturing conditions. A control section corrects preset image-capturing conditions on the basis of an analysis result of an image captured by an image capturing device included in a mobile body. A driving control section controls driving of the mobile body on the basis of the corrected image-capturing conditions. The present technique is applicable to a mobile-body control system that controls the mobile body.

10 Claims, 29 Drawing Sheets

(51) Int. Cl.
*B64D 47/08* (2006.01)
*B64U 101/30* (2023.01)
*G05D 1/00* (2006.01)

(58) Field of Classification Search
CPC .... B64U 2201/20; G03B 15/00; G03B 37/00; G05D 1/0094; G05D 1/0607; H04N 23/60; H04N 23/65; H04N 23/6811; H04N 23/687; H04N 23/695; H04N 5/144

See application file for complete search history.

(56) References Cited

U.S. PATENT DOCUMENTS

| | | | |
|---|---|---|---|
| 11,603,196 B2* | 3/2023 | Lindsey | G05D 1/0808 |
| 11,670,274 B2* | 6/2023 | Fong | B64U 20/20 |
| | | | 381/71.1 |
| 2015/0336671 A1 | 11/2015 | Winn et al. | |

FOREIGN PATENT DOCUMENTS

| | | |
|---|---|---|
| CN | 107532898 A | 1/2018 |
| CN | 107589691 A | 1/2018 |
| JP | 2006-145357 A | 6/2006 |
| JP | 2017-007603 A | 1/2017 |
| JP | 2017-015704 A | 1/2017 |
| JP | 2017027355 A | 2/2017 |
| JP | 2017047883 | 3/2017 |
| JP | 2018-152737 A | 9/2018 |

* cited by examiner

F I G . 3

| IMAGE-CAPTURING CONDITIONS (CONDITIONS CONCERNING MOBILE BODY) | |
|---|---|
| IMAGE-CAPTURING ALTITUDE | IMAGE-CAPTURING (FLIGHT) HEIGHT FROM GROUND (REFERENCE SURFACE) |
| IMAGE-CAPTURING RANGE | IMAGE-CAPTURING TARGET RANGE, AREA |
| IMAGE-CAPTURING ROUTE | FLIGHT ORDER. IMAGE-CAPTURING ROUTE IS SET SO AS TO COVER NORMAL IMAGE-CAPTURING RANGE BY SINGLE STROKE |
| IMAGE-CAPTURING POINT | POSITION AT WHICH MOBILE BODY IS PRESENT WHILE SHUTTER IS OPENED/CLOSED WHEN IMAGE CAPTURING IS PERFORMED |
| MOVING SPEED AT TIME OF IMAGE CAPTURING TIME | MOVING SPEED OF MOBILE BODY WHEN IMAGE CAPTURING IS PERFORMED (WHEN MOVING SPEED IS HIGH, BLURRING CAN OCCUR IN RESULT OF IMAGE CAPTURING) |
| OVERLAP (SIDE OVERLAP) AMOUNT | OVERLAP RANGE OF IMAGES TO BE COMBINED. OVERLAP AMOUNT IS REPRESENTED BY RATIO TO IMAGE-CAPTURING RANGE OF ONE-TIME SHUTTER |
| IMAGE-CAPTURING CONDITIONS (CONDITIONS CONCERNING CAMERA) | |
| CAPTURED-IMAGE STORAGE RESOLUTION | NUMBER OF PIXELS PER UNIT AREA. AS CAPTURED-IMAGE STORAGE RESOLUTION IS HIGHER, OBJECT CAN BE EXPRESSED WITH HIGHER PRECISION |
| IMAGE-CAPTURING EXPOSURE TIME PERIOD | SHUTTER OPENING/CLOSING TIME PERIOD OF ONE-TIME IMAGE CAPTURING. AS IMAGE-CAPTURING EXPOSURE TIME PERIOD IS LONGER, CAPTURED IMAGE BECOMES BRIGHTER, BUT INCREASE IN AMOUNT OF BLURRING IS LIKELY TO OCCUR |

OVERLAP AMOUNT IS SMALL
LOW-RESOLUTION REGION IS ALSO USED

OVERLAP AMOUNT IS LARGE
RESOLUTION IS HIGH

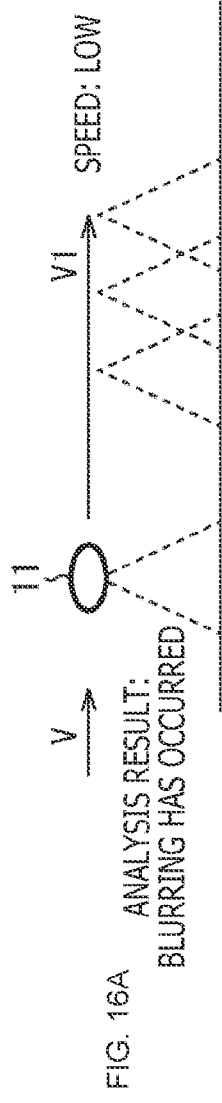
FIG. 16A ANALYSIS RESULT: BLURRING HAS OCCURRED
BLURRING AMOUNT OF CAPTURED IMAGE IS ANALYZED ⇒ WHEN BLURRING HAS OCCURRED, MOBILE BODY IS CONTROLLED TO REDUCE MOVING SPEED
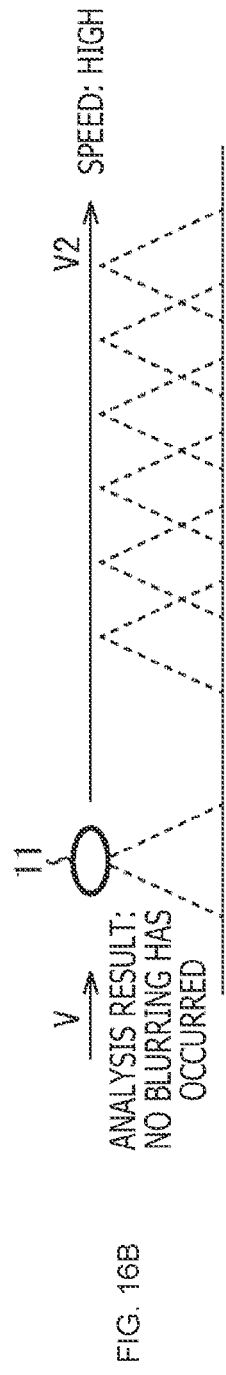
FIG. 16B ANALYSIS RESULT: NO BLURRING HAS OCCURRED
BLURRING AMOUNT OF CAPTURED IMAGE IS ANALYZED ⇒ WHEN NO BLURRING HAS OCCURRED, MOBILE BODY IS CONTROLLED TO INCREASE MOVING SPEED

CONTROL DEVICE AND METHOD

CROSS REFERENCE TO RELATED APPLICATIONS

This application is a U.S. National Phase of International Patent Application No. PCT/JP2019/023232 filed on Jun. 12, 2019, which claims priority benefit of Japanese Patent Application No. JP 2018-120458 filed in the Japan Patent Office on Jun. 26, 2018. Each of the above-referenced applications is hereby incorporated herein by reference in its entirety.

TECHNICAL FIELD

The present technique relates to a control device and method and a program, and particularly, relates to a control device and method and a program for enabling image capturing under optimum image-capturing conditions.

BACKGROUND ART

In a case where a drone is used to take an aerial photograph for creating maps or the like, an image capturing plan needs to be preliminarily determined. A technology of calculating a shortest route and an image-capturing point by designating a desired image-capturing resolution and an image-capturing area has conventionally been proposed.

PTL 1 proposes, as a camera unit to be mounted on a drone, a camera unit for performing mapping of the status of land.

CITATION LIST

Patent Literature

[PTL 1]
Japanese Patent Laid-Open No. 2017-15704

SUMMARY

Technical Problem

It is difficult to take measures against a case where image capturing according to a plan cannot be performed due to disturbances such as wind, obstacles, and backlight. In such a case, image capturing needs to be performed again, or manned monitoring needs to be carried out during image capturing.

The present technique has been achieved in view of the above circumstances and enables image capturing under optimum image-capturing conditions.

Solution to Problem

A control device according to one aspect of the present technique includes a control section that corrects a preset image-capturing condition on the basis of an analysis result of an image captured by an image capturing device included in a mobile body; and a driving control section that controls driving of the mobile body on the basis of the corrected image-capturing condition.

In the one aspect of the present technique, a preset image-capturing condition is corrected on the basis of an analysis result of an image captured by the image capturing device included in the mobile body. On the basis of the corrected image-capturing condition, driving of the mobile body is controlled.

Advantageous Effect of Invention

According to the present technique, image capturing can be performed under optimum image-capturing conditions.

It is to be noted that the above effect is not necessarily limitative. Any of effects described in the present disclosure may be provided.

BRIEF DESCRIPTION OF DRAWINGS

FIG. 3 is a diagram depicting detailed examples of image-capturing conditions.

FIGS. 16A and 16B depict diagrams of examples of correcting a moving speed by analyzing a blurring amount in a captured image.

DESCRIPTION OF EMBODIMENTS

Hereinafter, explanations of modes for carrying out the present technique will be given. The explanations will be given in the following order.

1. First Embodiment (mobile body)
2. Second Embodiment (mobile body+control device)
3. Computer

1. First Embodiment

<Example of Mobile-Body Control System>

Figure 1:
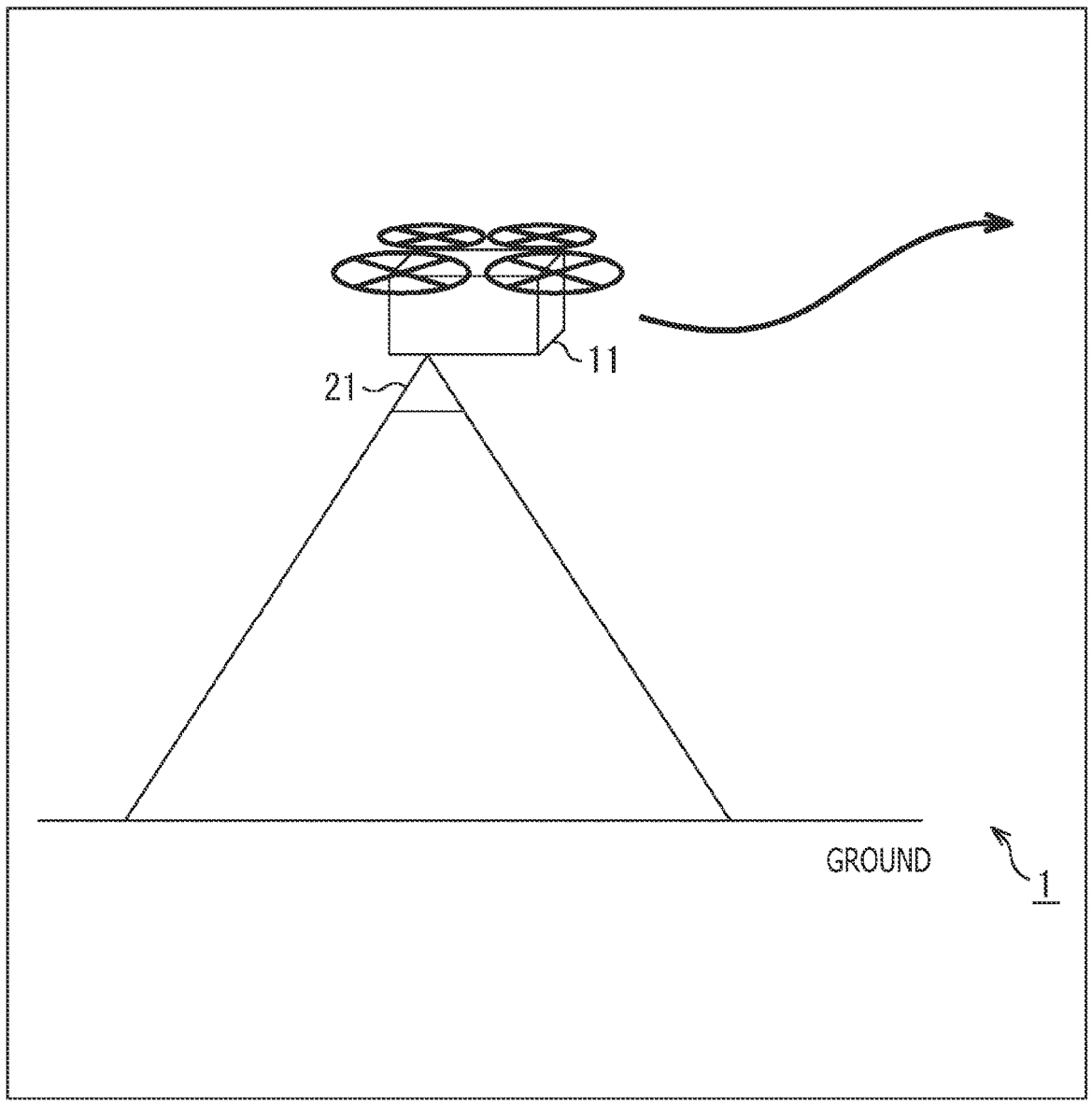
FIG. 1 is a diagram depicting a mobile-body control system to which the present technique is applied.

FIG. 1 is a diagram depicting a mobile-body control system to which the present technique is applied.

As depicted in FIG. 1, a mobile-body control system 1 includes a mobile body 11 having an image capturing section 21 such as a camera. The mobile body 11 depicted in FIG. 1 is what is called a drone which is an aircraft capable of carrying out unmanned flight. A mobile body such as a robot, a vehicle, or a truck which can autonomously move may be used as the mobile body 11.

In a case where an image of a certain location is captured by use of the mobile body 11, an image capturing plan needs to be preliminarily determined. For the mobile body 11, a user designates a desired image-capturing resolution and a desired image capturing area, so that image-capturing conditions such as a route and an image-capturing point are set.

While moving on the basis of the set image-capturing conditions, the mobile body 11 captures an image of a subject by controlling the image capturing section 21.

Further, the mobile body 11 corrects preset image-capturing conditions on the basis of an analysis result of an image captured by the image capturing section 21. Movement and an image-capturing timing of the mobile body 11 are controlled on the basis of the corrected image-capturing conditions.

<Flow of Image Capturing Process>

The flow of an image capturing process will be explained with reference to FIGS. 2A and 2B.

Figure 2A:
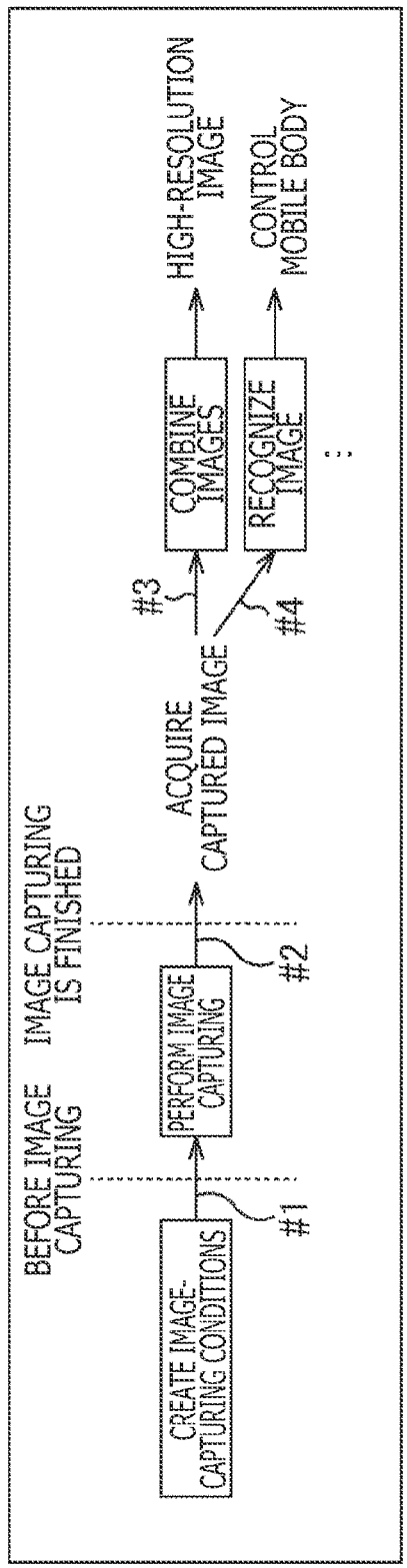
FIGS. 2A and 2B depict explanatory diagrams of the flows of image capturing processes.

FIG. 2A simply depicts the flow of an image capturing process in a conventional mobile body.

In the example in FIG. 2A, image-capturing conditions are created prior to image capturing, and then, image capturing is performed on the basis of the created image-capturing conditions, as indicated by an arrow #1. After image capturing is finished, a captured image is acquired by being taken into, for example, a PC or the like, as indicated by an arrow #2, and image combining is performed, as indicated by an arrow #3, so that a high-resolution image is generated. In addition, image recognition is performed, as indicated by an arrow #4. Thus, the mobile body is controlled.

As described above, the conventional mobile body can only perform image capturing according to preset image-capturing conditions. Therefore, in a case where image capturing cannot be performed according to the conditions due to disturbances such as wind, obstacles, and backlight, image capturing needs to be performed again or manned monitoring needs to be performed.

Figure 2B:
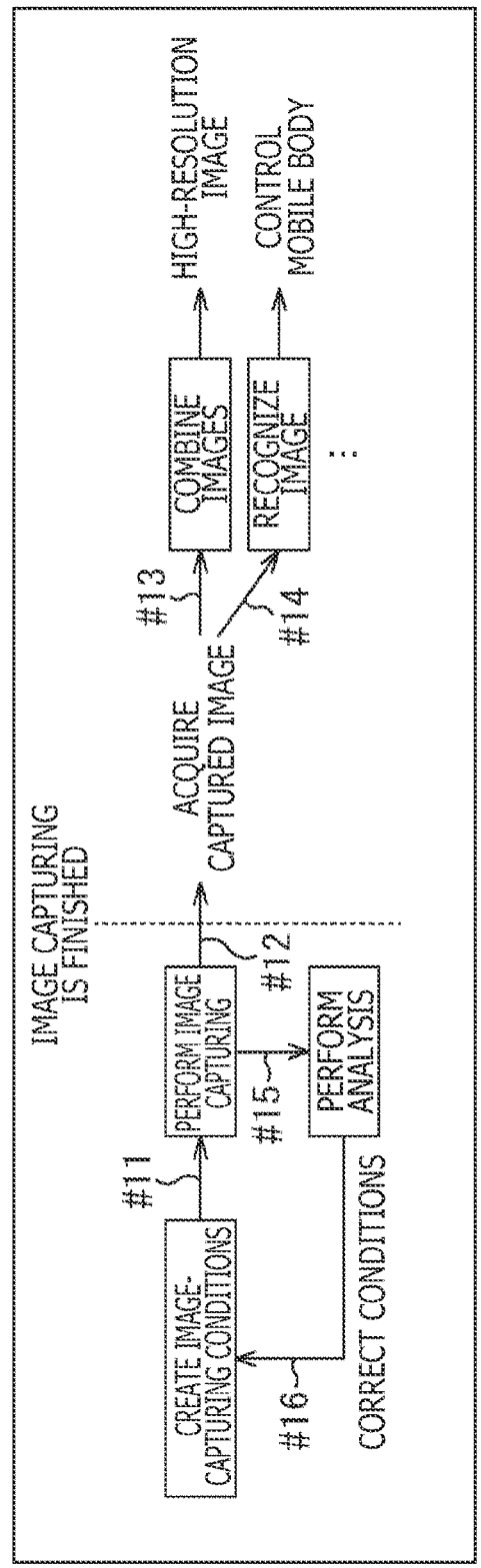

FIG. 2B simply depicts the flow of an image capturing process in the mobile-body control system 1 in FIG. 1.

In the example in FIG. 2B, image-capturing conditions are created prior to image capturing, and then, image capturing is performed on the basis of the created image-capturing conditions, as indicated by an arrow #11.

After image capturing is finished, a captured image is acquired by being taken into, for example, a PC or the like, as indicated by an arrow #12, and image combining is performed, as indicated by an arrow #13, so that a high-resolution image is generated. Also, image recognition is performed, as indicated by an arrow #14, so that the mobile body is controlled.

The flow so far is similar to that of the image capturing process depicted in FIG. 2A. However, in the mobile-body control system 1, a captured image is analyzed before the image capturing is finished, as indicated by an arrow #15. Also, the image-capturing conditions are corrected on the basis of an analysis result, as indicated by an arrow #16. After the image-capturing conditions are corrected, image capturing is performed on the basis of the corrected image-capturing conditions.

Image capturing according to image-capturing conditions, analysis of the captured image, and correction of the image-capturing conditions on the basis of an analysis result of the image are automatically repeated, irrespective of a user's operation, until the image capturing is finished.

Accordingly, the mobile-body control system 1 can perform image capturing under image-capturing conditions corresponding to a situation at the time of the image capturing, without performing image capturing again.

<Details of Image-Capturing Conditions>

FIG. 3 is a diagram depicting examples of image-capturing conditions.

As depicted in FIG. 3, the image-capturing conditions include six image-capturing conditions concerning the mobile body and two image-capturing conditions concerning a camera.

Examples of the image-capturing conditions concerning the mobile body include an image-capturing altitude, an image-capturing range, an image-capturing route, an image-capturing point, a moving speed at the time of image capturing, and an overlap amount (side overlap amount).

The image-capturing altitude refers to an image-capturing (flight) height from the ground (a reference surface).

The image-capturing range refers to an image-capturing target range (area).

The image-capturing route refers to a flight order. The image-capturing route is normally set so as to cover the image-capturing range by a single stroke.

The image-capturing point refers to a position at which the mobile body is present while a shutter is opened/closed in an image capturing time.

The moving speed at the time of image capturing refers to a moving speed or flight speed of the mobile body at the time of image capturing. When the moving speed at the time of image capturing is high, there is a possibility that blurring occurs in the result of the image capturing. It is to be noted that, hereinafter, the moving speed at the time of image capturing is referred to as a moving speed.

The overlap amount refers to an amount of an overlap range of images to be combined when the mobile body travels in a straight line. The side overlap amount refers to an amount of an overlap range of images to be combined when the mobile body makes a turn. The overlap amount and the side overlap amount are each expressed by the ratio of overlapping with respect to an image-capturing range of one-time shutter.

The image-capturing conditions concerning the camera include a captured-image storage resolution and an image-capturing exposure time period, for example.

The captured-image storage resolution refers to the number of pixels per unit area when a captured image is stored. As the captured-image storage resolution is higher, an object can be expressed with higher precision.

The image-capturing exposure time period refers to a shutter opening/closing time period of one-time image capturing. As the image-capturing exposure time period is longer, a captured image becomes brighter, but an increase in the amount of blurring is likely to occur.

Figure 4:
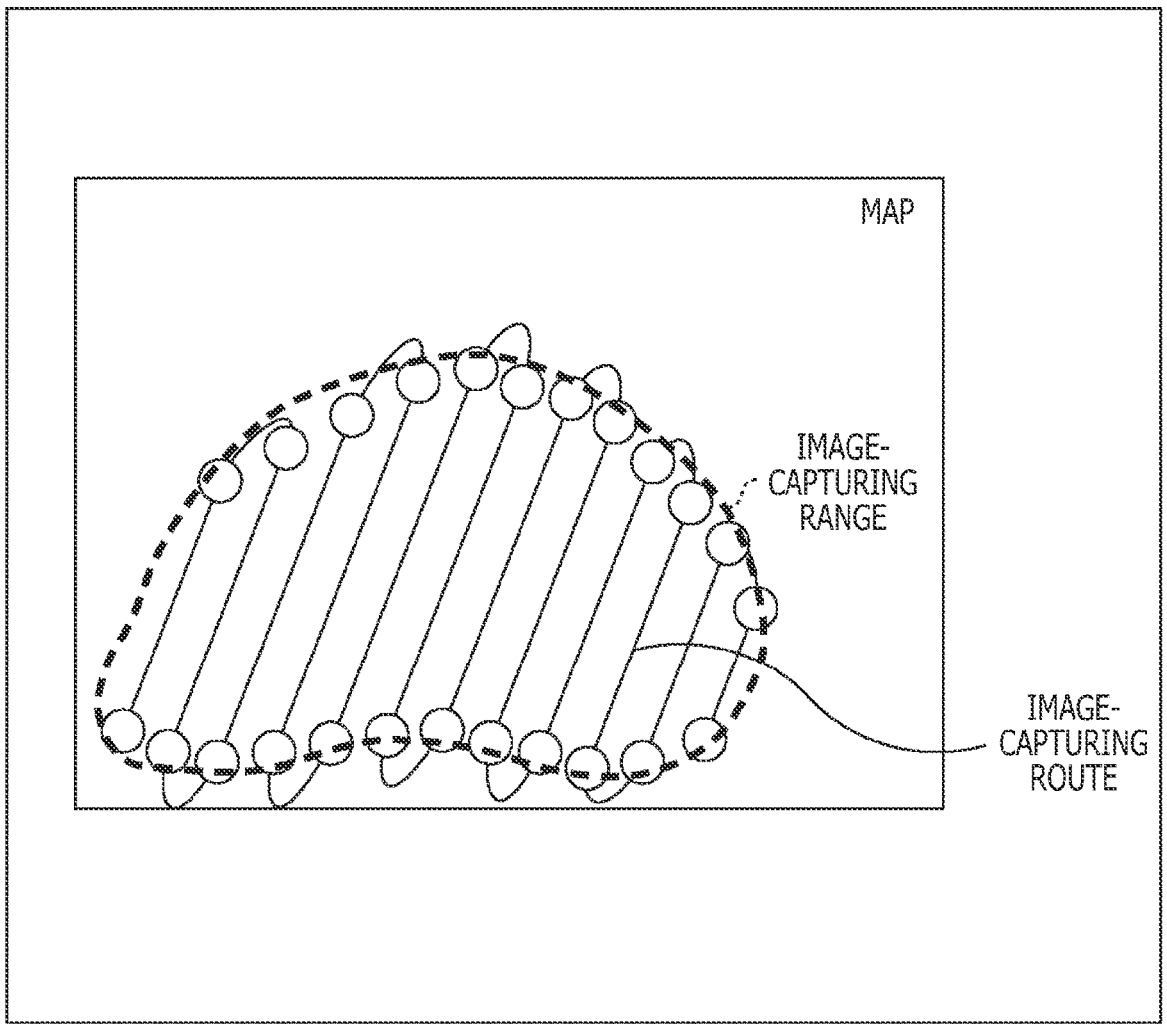
FIG. 4 is a diagram depicting an example of an image-capturing range and an image-capturing route.

FIG. 4 is a diagram depicting an example of an image-capturing range and an image-capturing route as image-capturing conditions.

FIG. 4 depicts a map or an aerial photograph of a certain range. An image-capturing range as one of the image-capturing conditions in FIG. 3 is indicated by a range surrounded by a broken line. An image-capturing route as one of the image-capturing conditions in FIG. 3 is indicated by a solid line connecting the image-capturing range and the vicinity of the edge thereof by a single stroke.

Figure 5:
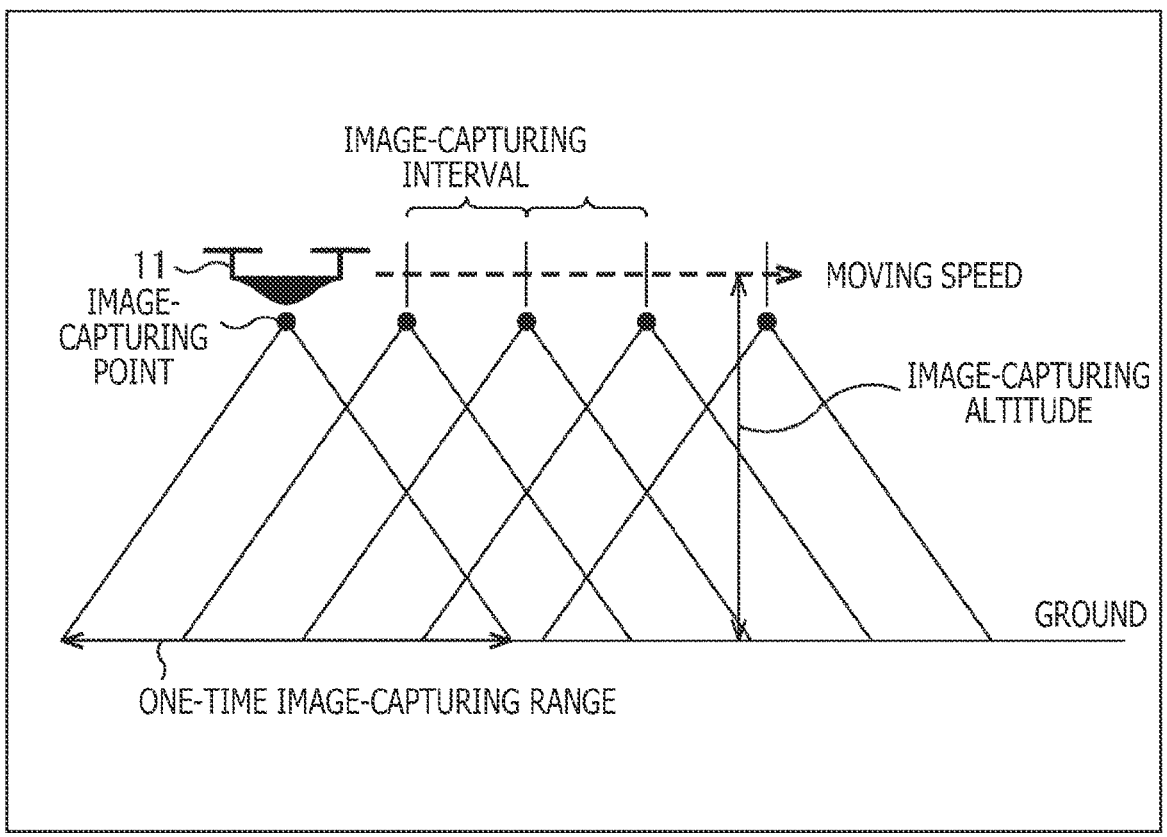
FIG. 5 is a diagram depicting examples of an image-capturing point, an image-capturing interval, an image-capturing altitude, and a moving speed.

FIG. 5 is a diagram depicting an example of an image-capturing point, an image-capturing interval, an image-capturing altitude, and a moving speed as image-capturing conditions.

FIG. 5 depicts a situation in which the mobile body 11 is capturing an image of the ground. In FIG. 5, an image-capturing range of one-time shutter is indicated by the base of each triangle. In a case where an image of the image-capturing range, which has been explained with reference to FIG. 4, is captured, image capturing is performed a plurality of times.

Also, an image-capturing point which is one of the image-capturing conditions in FIG. 3 is indicated by a black circle positioned at an apex of each triangle. An image-capturing interval is indicated by a space between the black circles. An image-capturing altitude which is one of the image-capturing conditions in FIG. 3 is indicated by an arrow extending from the mobile body 11 to the ground. A moving speed which is one of the image-capturing conditions in FIG. 3 is indicated by a rightward arrow extended from the mobile body 11.

Figure 6A:
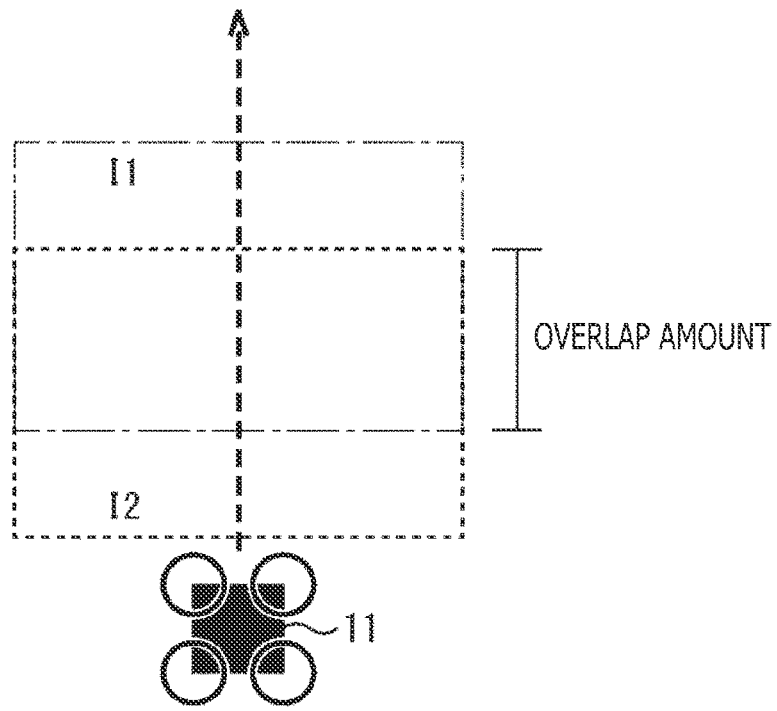
FIGS. 6A and 6B depict diagrams of examples of an overlap amount.
Figure 6B:
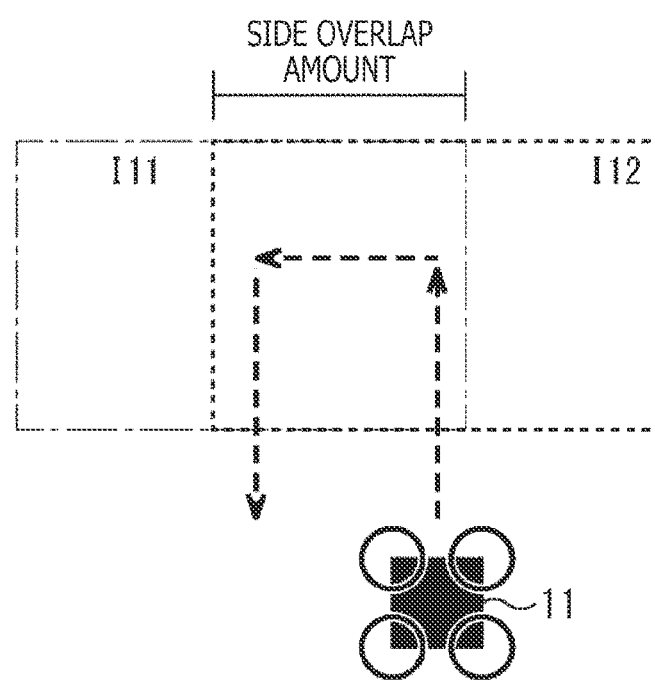

FIGS. 6A and 6B depict diagrams of examples of an overlap amount.

In a case where an image I1 indicated by a one dotted chain line and an image I2 indicated by a broken line are captured by upward movement as indicated by a broken line arrow in FIG. 6A, an amount by which the image I1 and the image I2 overlap each other is an overlap amount.

In a case where an image I11 indicated by a one dotted chain line and an image I12 indicated by a broken line are captured by upward, leftward, and leftward movements as indicated by broken line arrows in FIG. 6B, an amount by which the image I11 and the image I12 overlap each other is a side overlap amount.

<Configuration Example of Mobile Body>

Figure 7:
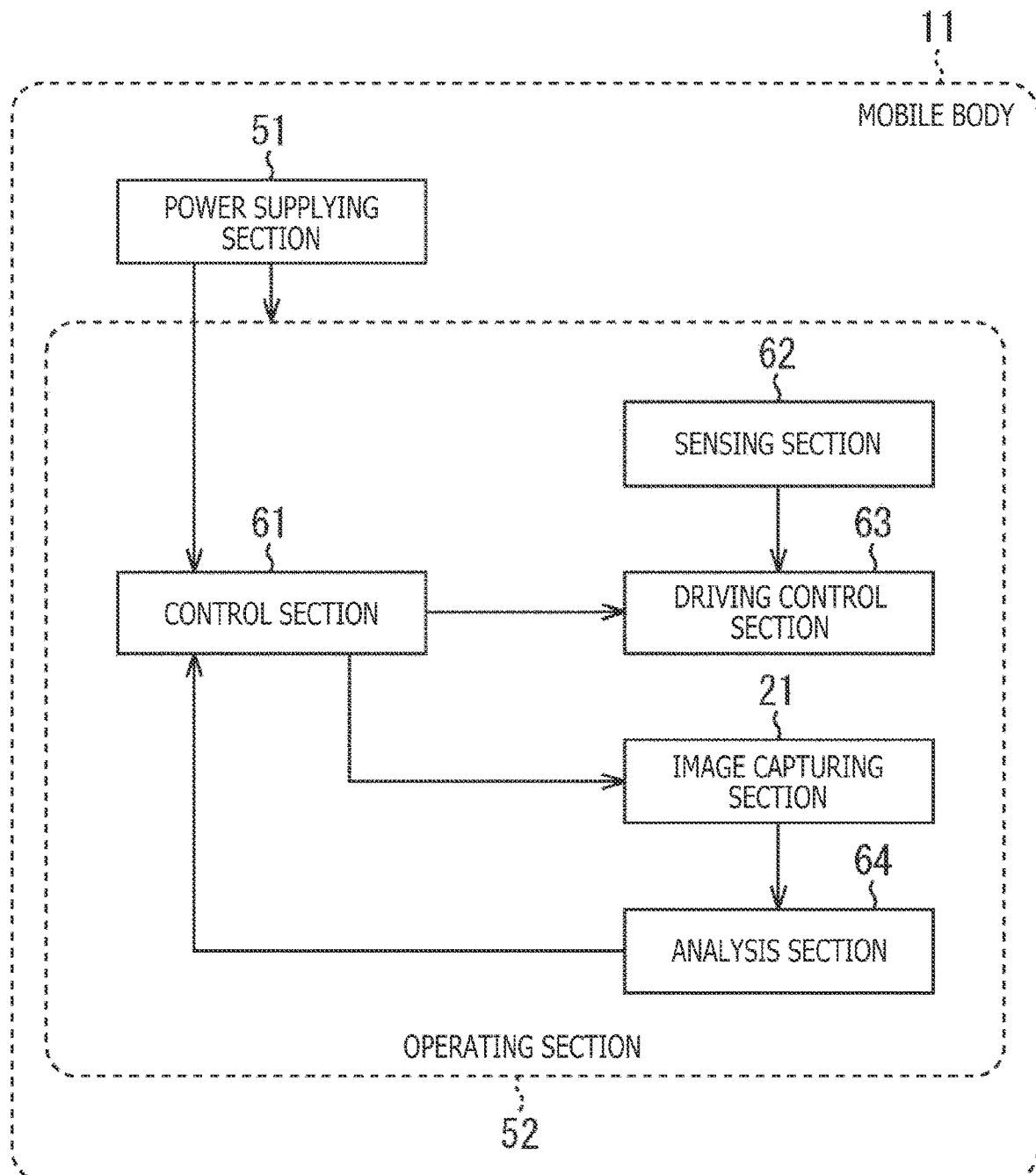
FIG. 7 is a block diagram depicting a configuration example of a mobile body.

FIG. 7 is a block diagram depicting a configuration example of the mobile body.

The mobile body 11 includes a power supplying section 51 and an operating section 52.

The power supplying section 51 includes a battery and a power supplying circuit, etc. The power supplying section 51 supplies power to the operating section 52. In addition, the power supplying section 51 outputs information such as remaining power information to the operating section 52. The remaining power information indicates the remaining power amount of the battery at a timing when measurement is conducted.

The operating section 52 includes a control section 61, a sensing section 62, a driving control section 63, and an analysis section 64, in addition to the abovementioned image capturing section 21. Each of the sections in the operating section 52 is operated by power supplied from the power supplying section 51.

The image capturing section 21 performs image capturing on the basis of an image-capturing instruction supplied from the control section 61. The image capturing section 21 outputs, to the analysis section 64, a captured image obtained by the image capturing.

The control section 61 includes a CPU, a ROM, a RAM, etc., and controls the entire operation of the mobile body 11 by executing a predetermined program. The control section 61 creates image-capturing conditions for the mobile body 11 on the basis of an input from a user and stores the conditions in an internal memory.

In addition, the control section 61 corrects preset image-capturing conditions on the basis of an analysis result of an image captured by the image capturing section 21.

Specifically, the control section 61 calculates an image-capturing condition correction value for correcting image-capturing conditions, on the basis of the analysis result supplied from the analysis section 64. The control section 61 corrects the image-capturing conditions on the basis of the calculated correction value and outputs the corrected image-capturing conditions to the driving control section 63. By this method, an image-capturing altitude, an image-capturing speed, an overlap amount, an image-capturing route, and an image-capturing range, among the image-capturing conditions, are corrected.

Further, the control section 61 calculates, on the basis of the remaining power information supplied from the power supplying section 51, a predicted remaining power amount as of a time when image capturing is fully finished. The control section 61 also corrects the image-capturing conditions on the basis of the calculated predicted remaining power amount.

The sensing section 62 includes various sensors that detect an altitude, an attitude, a speed, etc. The sensing section 62 outputs sensing information indicating the detection results of an altitude, an attitude, a speed, etc., to the driving control section 63.

The driving control section 63 controls driving of the mobile body 11 on the basis of the corrected image-capturing conditions. For example, the driving control section 63 causes the mobile body 11 to move to a desired position by driving a motor or the like on the basis of the image-capturing conditions. Moreover, in a case where the mobile body 11 is not operating according to the image-capturing conditions, the driving control section 63 modifies driving of the motor or the like, by using the sensing information supplied from the sensing section 62.

The analysis section 64 analyzes the captured image supplied from the image capturing section 21 and outputs an analysis result regarding a feature amount or the like to the control section 61. The analysis is carried out on a real time basis.

<Correction of Image-Capturing Altitude Through Analysis of Band>

Figure 8:
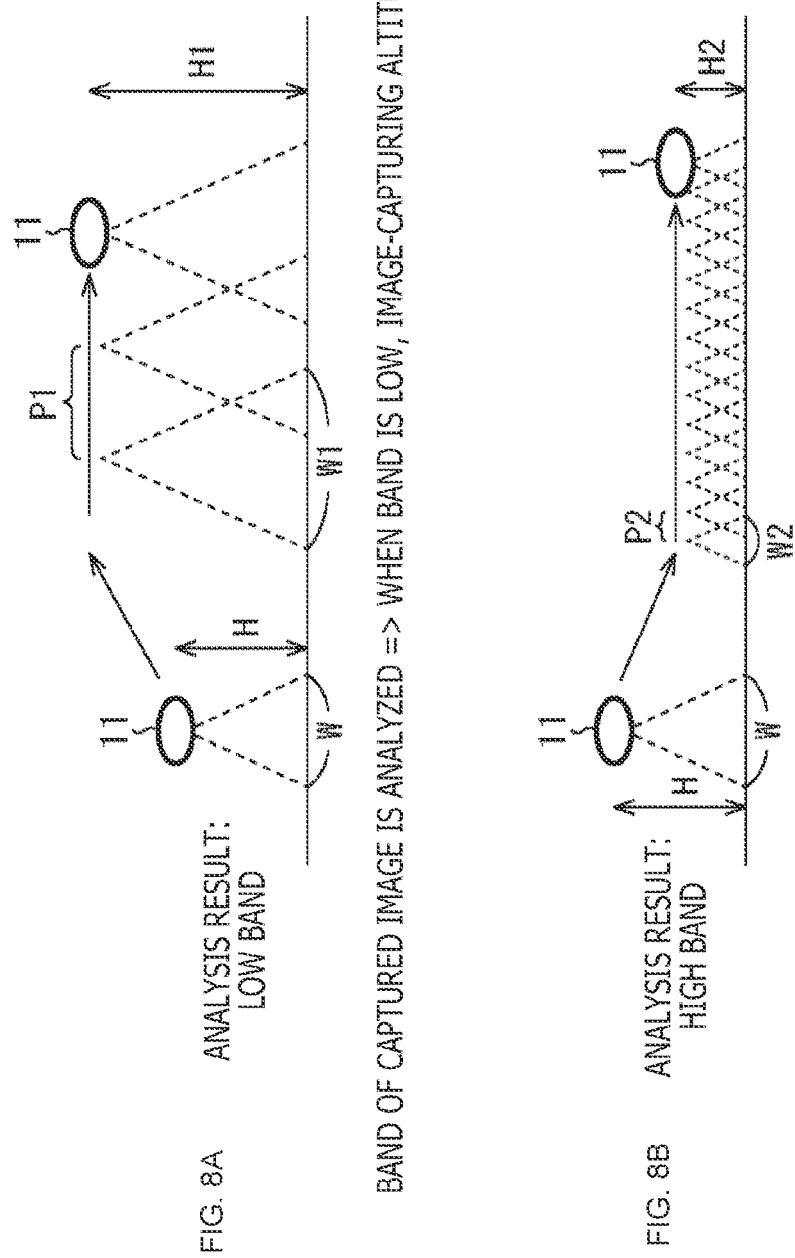
FIGS. 8A and 8B depict diagrams of examples of correcting an image-capturing altitude by analyzing the band of a captured image.

FIGS. 8A and 8B depict diagrams of examples of correcting an image-capturing altitude by analyzing the band of a captured image.

Analysis of the band of a captured image is carried out so as to analyze which frequency component in a spatial frequency of the captured image is numerous, for example. When the band of the captured image is low, there are many low frequency components, that is, the image is gentle. When the band of the captured image is high, there are many high frequency components, that is, the image is fine.

It is assumed that the mobile body 11 performs image capturing based on an image-capturing altitude H, a one-time image capturing range W, and an image-capturing interval P.

In a case where an analysis result of the band of a captured image illustrates a low band, as depicted in FIG. 8A, the image-capturing altitude of the mobile body 11 is corrected to be increased to an image-capturing altitude H1 (>H).

When the image-capturing altitude is increased to the image-capturing altitude H1, an image having a low resolution, which cannot express fineness, compared to the image captured at the image-capturing altitude H is captured. However, an image-capturing range W1 (>W) that can be captured by one-time image capturing becomes wider, so that an interval P1 between image-capturing points also becomes wider. In addition, the number of times of releasing a shutter for capturing images is reduced, so that a period of time required to perform image capturing is shortened.

In contrast, in a case where an analysis result of the band of a captured image illustrates a high band, as depicted in FIG. 8B, the image-capturing altitude of the mobile body 11 is corrected to be lowered to an image-capturing altitude H2 (<H).

When the image-capturing altitude is lowered to the image-capturing altitude H2, an image having a high resolution, which can express fineness, compared to the image captured at the image-capturing altitude H is captured. However, an image-capturing range W2 (<W) that can be captured by one-time image capturing is narrowed. Further, the number of times of releasing a shutter for capturing images is increased, so that a period of time required to perform image capturing is lengthened.

As explained so far, the band of a captured image is corrected, that is, the image-capturing altitude is corrected according to the fineness of a subject, and control is performed at the corrected image-capturing altitude. Accordingly, image capturing can be performed with a suitable quality.

It is to be noted that, as a specific method for analyzing a range and a band of a captured image for use in band analysis, the following methods are possible.

(a) The entirety of an image captured by releasing a shutter one time is used for analysis.

(b) Only a non-overlap part of an image captured by releasing a shutter one time is used for analysis.

(c-1) A preset particular subject is recognized by an image recognition technology, and only a range including the particular subject is used for analysis.

(c-2) When a set particular subject is included in an image, an operation of lowering an image-capturing altitude independently of a range or a band may be conducted.

In the case of (a), stable control can be performed because abrupt variations in pixel values are smoothed.

Since overlap parts in captured images overlap one another, there is a possibility that the parts are not actually used for a captured image. However, a non-overlap part in the case of (b) imposes a limitation on image points to be actually used for a captured image, so that the accuracy is high.

It is to be noted that, in a case where a specific subject cannot be recognized, which is the reverse of (c-2), control for lowering an altitude may be performed in order to perform fine image capturing.

Next, the control process in FIGS. 8A and 8B, which is performed by the mobile-body control system 1, will be explained with reference to a flowchart in FIG. 9.

In step S11, the control section 61 sets an image-capturing altitude.

In step S12, the driving control section 63 starts flight and image capturing.

In step S13, the image capturing section 21 performs image capturing of one-time shutter. The image capturing section 21 outputs a captured image obtained by the image capturing to the analysis section 64.

In step S14, the control section 61 determines whether or not image capturing is completed in all image-capturing ranges. In a case where incompletion of the image capturing in all image-capturing ranges is determined in step S14, the process proceeds to step S15.

In step S15, the analysis section 64 analyzes the band of the captured image. The analysis section 64 outputs an analysis result of the band of the captured image to the control section 61.

In step S16, the control section 61 calculates a correction value for correcting the image-capturing altitude, on the basis of the analysis result. The correction value of the image-capturing altitude is calculated by use of such a graph as that depicted in FIG. 10.

Figure 10:
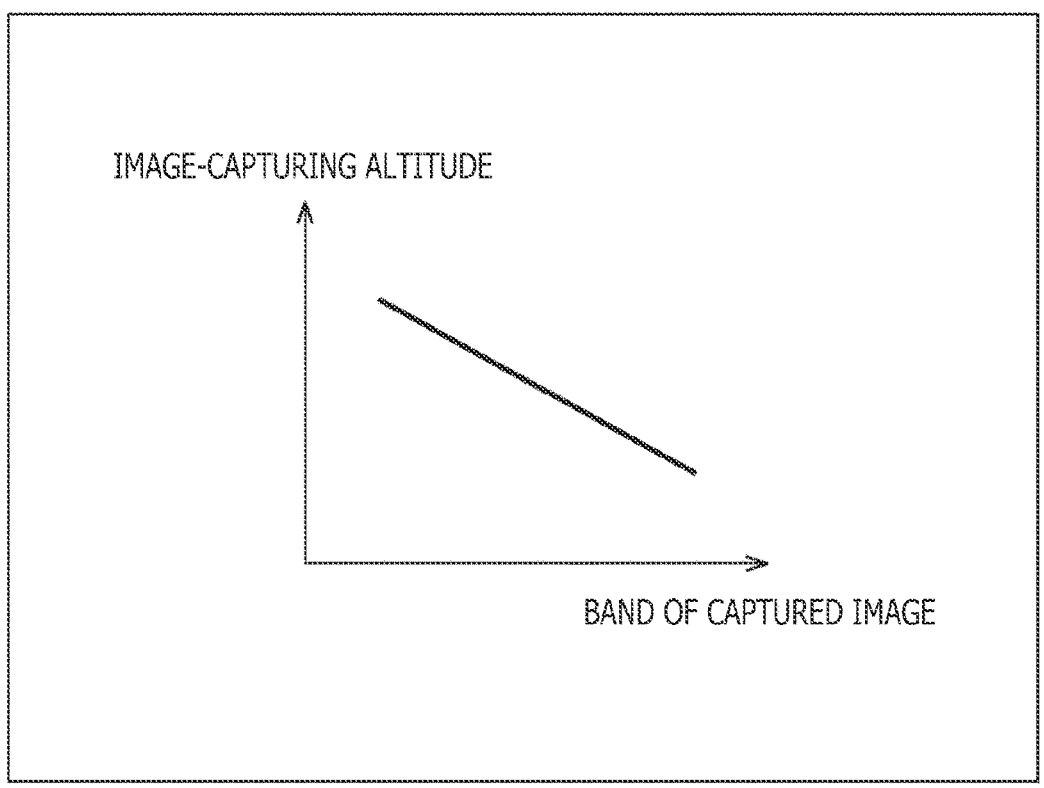
FIG. 10 is a diagram depicting an example of the relation between the band of a captured image and an image-capturing altitude.

FIG. 10 depicts the relation between the band of a captured image and an image-capturing altitude. As depicted in FIG. 10, an image-capturing altitude becomes lower as the band of a captured image becomes higher. For example, information indicating a relation preset by a user, such as that depicted in FIG. 10, is stored in the memory of the control section 61.

The control section 61 corrects the image-capturing altitude, on the basis of the correction value corresponding to the analysis result of the band of the captured image, and outputs the corrected image-capturing altitude to the driving control section 63.

In step S17, the driving control section 63 changes the image-capturing altitude on the basis of the corrected image-capturing altitude supplied from the control section 61.

On the other hand, in a case where completion of the image capturing in all image-capturing ranges is determined in step S14, the control process is ended.

<Correction of Overlap Amount by Analysis of Band>

Figure 11A:
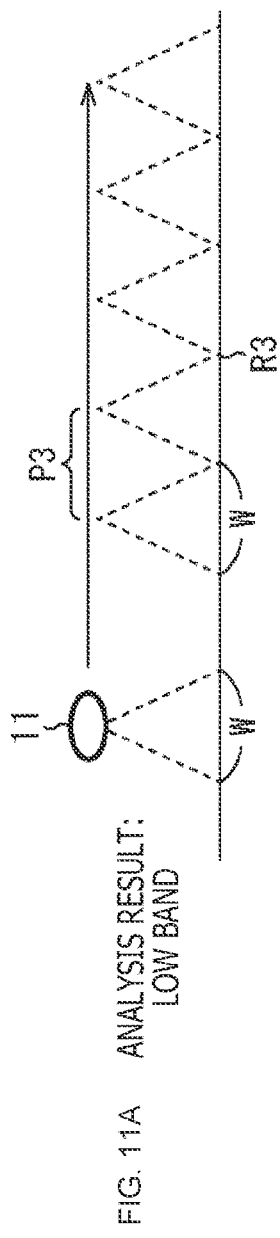
FIGS. 11A and 11B depict diagrams of examples of correcting an overlap amount by analyzing the band of a captured image.
Figure 11B:
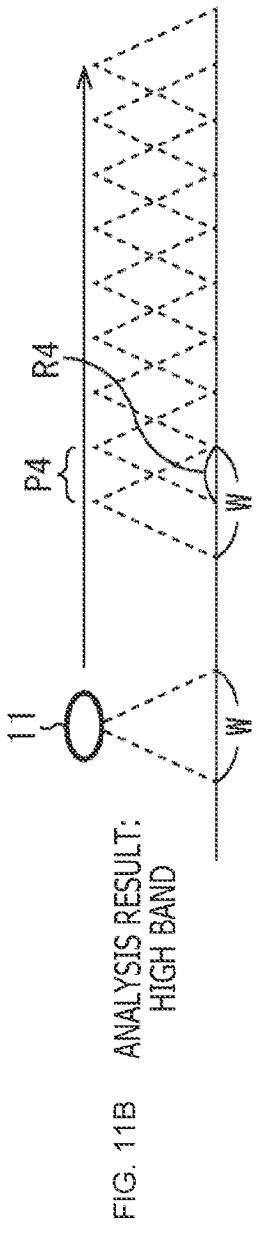

FIGS. 11A and 11B depict diagrams of examples of correcting an overlap amount by analyzing the band of a captured image.

The mobile body 11 performs image capturing based on a one-time image capturing range W, an overlap amount R, and an image-capturing interval P.

In a case where an analysis result of the band of a captured image illustrates a low band, as depicted in FIG. 11A, the overlap amount R of the mobile body 11 is corrected to be reduced to an overlap amount R3 (<R). It is to be noted that the overlap amount R3 in FIG. 11A is almost 0.

Reducing the overlap amount is equal to widening the image-capturing interval. In FIG. 11A, the image-capturing interval is corrected to be widened to an image-capturing interval P3 (>P).

When the overlap amount is reduced to the overlap amount R3, an image having a low resolution, which cannot express fineness, is captured. However, the interval P3 between image-capturing points is widened. Further, the number of releasing a shutter for capturing images is reduced, so that a period of time required to perform image capturing is shortened.

In contrast, in a case where an analysis result of the band of a captured image illustrates a high band, as depicted in FIG. 11B an overlap amount of the mobile body 11 is corrected to be increased to an overlap amount R4 (>R).

Increasing an overlap amount is equal to narrowing an image-capturing interval. In FIG. 11B the image-capturing interval is controlled to be narrowed to an image-capturing interval P4 (>P).

When the overlap amount is increased to the overlap amount R4, an image having a high resolution, which can express further fineness, is captured. However, the interval P4 between image-capturing points is widened, and the number of releasing a shutter for capturing images is increased, so that a period of time required to perform image capturing is lengthened.

As explained so far, the band of a captured image is corrected, that is, the overlap amount is corrected according to the fineness of a subject, and position control is performed on the basis of the corrected overlap amount. Accordingly, image capturing can be performed with a suitable quality.

Figure 12:
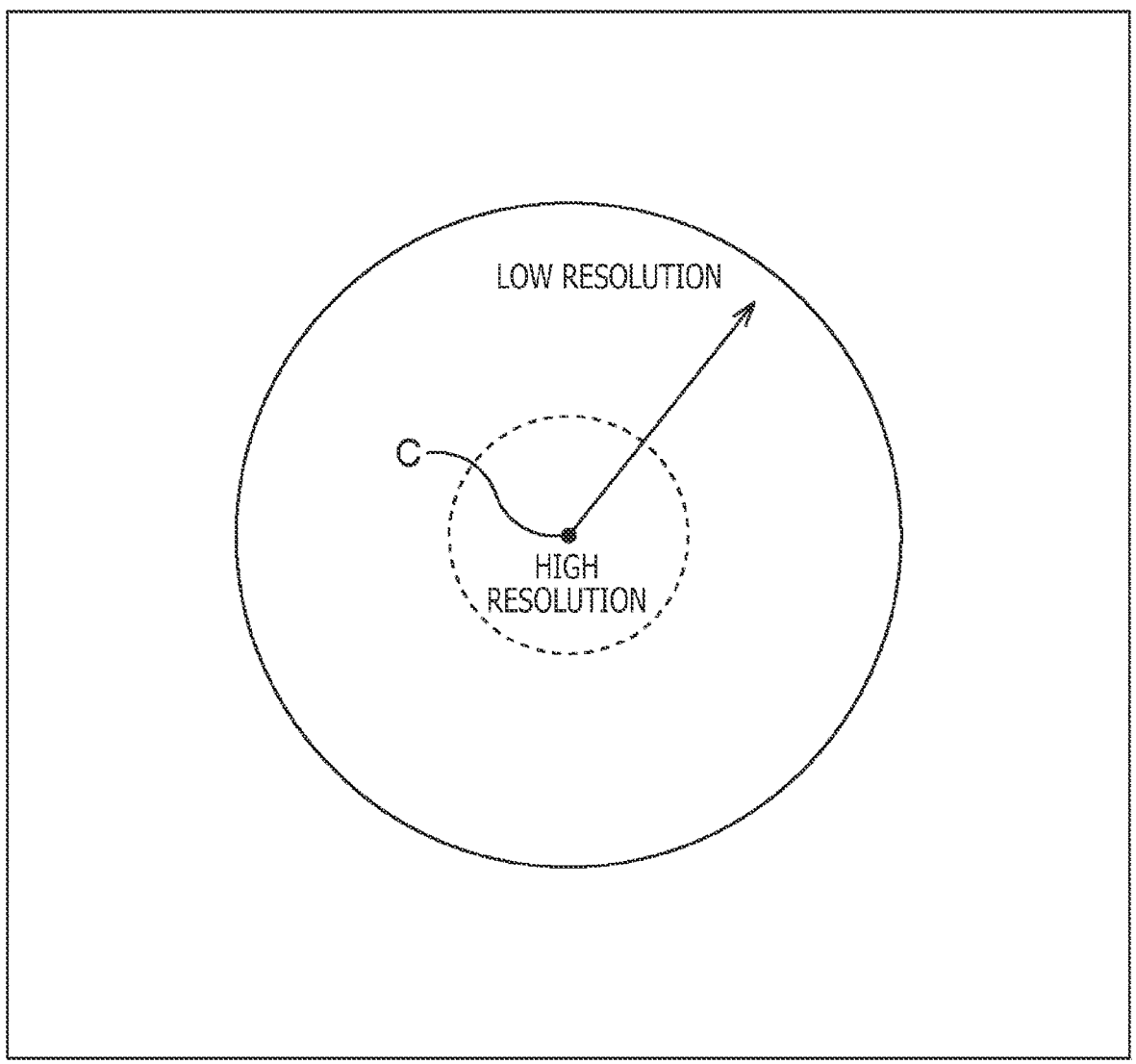
FIG. 12 is a diagram schematically depicting a range which is taken by a lens when a shutter is released one time.

FIG. 12 is a diagram schematically depicting a range which is taken by a lens when a shutter is released one time.

In FIG. 12, a solid-line circle indicates a range which is taken by a lens when a shutter is released one time, and a broken-line circle indicates a region near a center point C of a captured image.

An image-capturing resolution generally becomes high in a region near a center point. In the region near the center point C of the captured image, as indicated by the broken-line circle, the image-capturing resolution is high. The image-capturing resolution becomes lower toward an edge. It is to be noted that the reduction degree of an image-capturing resolution varies according to lens characteristics.

Figure 13A:
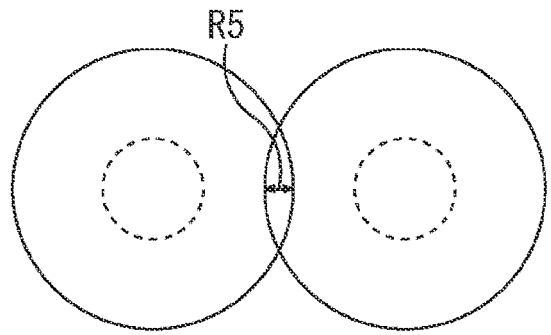
FIGS. 13A and 13B depict diagrams each schematically depicting a range which is taken by a lens when a shutter is successively released multiple times.
Figure 13B:
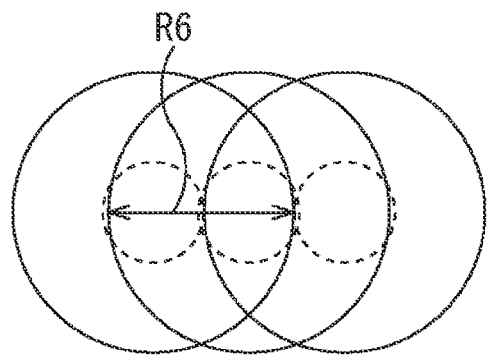

FIGS. 13A and 13B depict diagrams each schematically depicting a range which is taken by a lens when a shutter is successively released multiple times.

FIGS. 13A and 13B depict an overlap region which is a range taken by a lens when the shutter is successively released multiple times.

In a case where an overlap amount R5 of the overlap region is small, as depicted in FIG. 13A, even a region having a low image-capturing resolution needs to be used for a captured image to be actually outputted.

In contrast, in a case where an overlap amount R6 of the overlap region is large, as depicted in FIG. 13B, a region having a high image-capturing resolution is used for a captured image to be actually outputted.

In the abovementioned manner, when the overlap amount is larger, a captured image having more excellent quality can be obtained.

Figure 14:
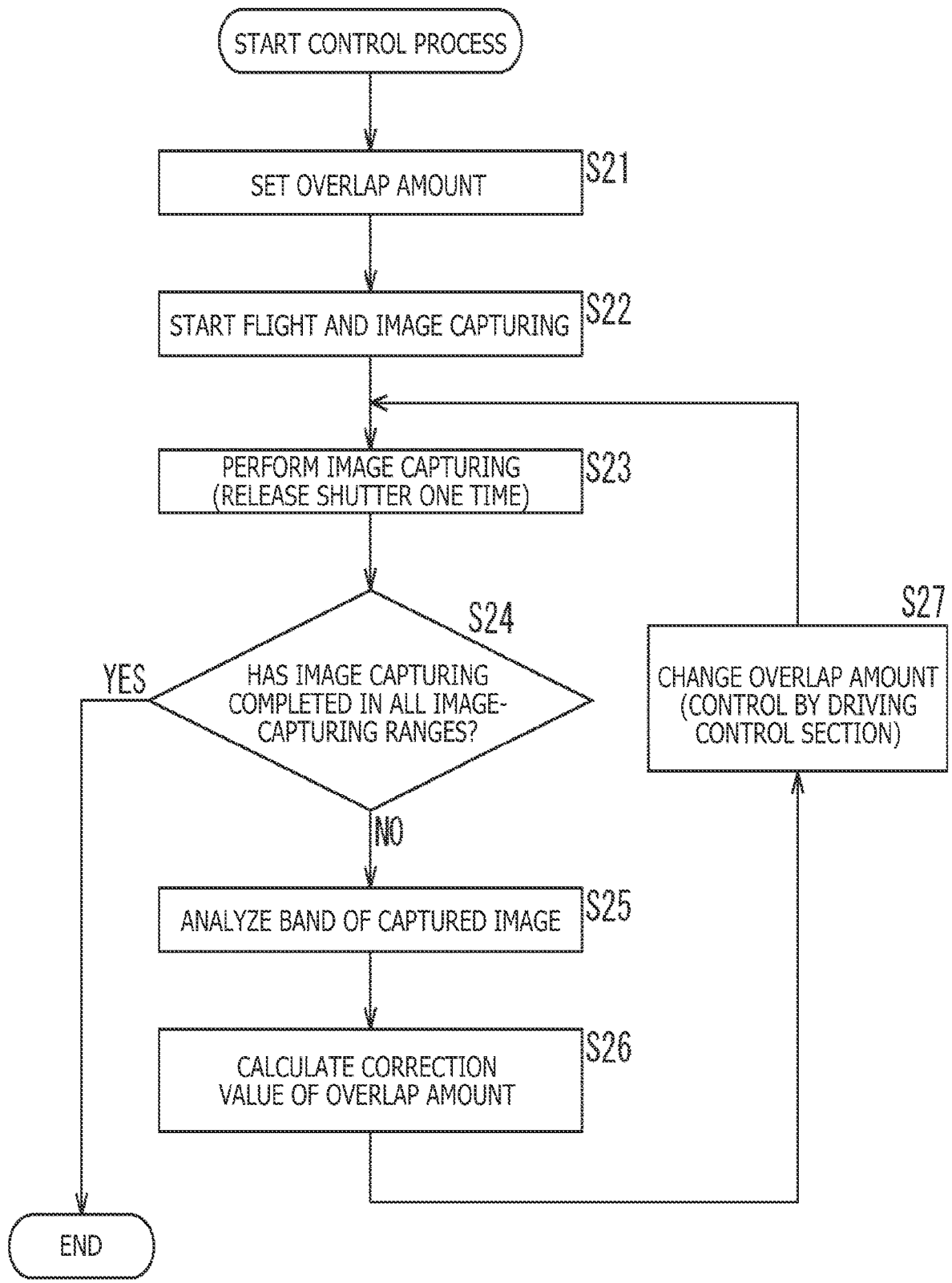
FIG. 14 is a flowchart for explaining a control process in FIGS. 11A and 11B.

Next, the control process in FIGS. 11A and 11B which is performed by the mobile-body control system 1, will be explained with reference to a flowchart in FIG. 14.

In step S21, the control section 61 sets an overlap amount.

In step S22, the driving control section 63 starts flight and image capturing.

In step S23, the image capturing section 21 performs image capturing of one-time shutter. The image capturing section 21 outputs a captured image obtained by the image capturing to the analysis section 64.

In step S24, the control section 61 determines whether or not image capturing is completed in all image-capturing ranges. In a case where incompletion of the image capturing in all image-capturing ranges is determined in step S24, the process proceeds to step S25.

In step S25, the analysis section 64 analyzes the band of the captured image. The analysis section 64 outputs the analysis result of the band of the captured image to the control section 61.

In step S26, the control section 61 calculates a correction value for correcting the overlap amount, on the basis of the analysis result. The correction value for the overlap amount is calculated by use of such a graph as that depicted in FIG. 15.

Figure 15:
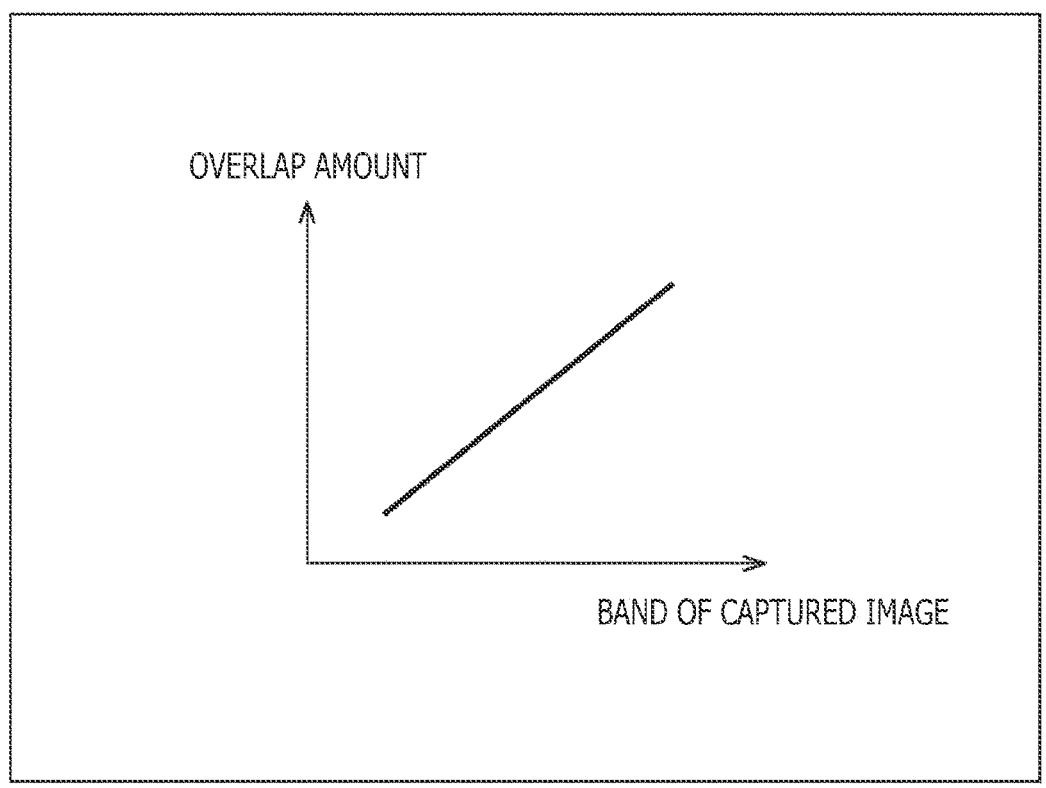
FIG. 15 is a diagram depicting an example of the relation between the band of a captured image and an overlap amount.

FIG. 15 depicts the relation between the band of a captured image and an overlap amount. As depicted in FIG. 15, as the band of a captured image becomes higher, an overlap amount becomes larger. For example, information indicating a relation preset by a user, such as that depicted in FIG. 15, is stored in the memory of the control section 61.

The control section 61 corrects the overlap amount, on the basis of the correction value corresponding to the analysis result of the band of the captured image, and outputs the corrected overlap amount to the driving control section 63.

In step S27, the driving control section 63 changes the overlap amount on the basis of the corrected overlap amount supplied from the control section 61.

On the other hand, in a case where completion of the image capturing in all image-capturing ranges is determined in step S24, the control process is ended.

<Correction of Moving Speed by Analysis of Blurring Amount in Captured Image>

FIGS. 16A and 16B depicts diagrams of examples of correcting a moving speed by analyzing the blurring amount in a captured image.

Examples of conditions under which blurring is likely to occur in a captured image include a condition in which the brightness is low, a condition in which wind is strong during the flight, and a condition in which the aperture of a camera included in the image capturing section is set to be narrow (a subject depth is deepened).

It is assumed that the mobile body 11 is moving at a moving speed V.

In a case where an analysis result indicating occurrence of blurring is obtained because the blurring amount in a captured image is greater than a predetermined threshold, as depicted in FIG. 16A, the moving speed of the mobile body 11 is corrected to be lowered to a moving speed V1 (<V).

When the moving speed is lowered to the moving speed V1, image capturing can be performed with a small amount of blurring. However, since the moving speed is low, a period of time required to perform image capturing is lengthened.

On the other hand, in a case where an analysis result indicating that no blurring has occurred is obtained because the blurring amount of an image captured by the mobile body 11 that is performing image capturing at the moving speed V is less than the predetermined threshold, as depicted in FIG. 16B, the moving speed of the mobile body 11 is corrected to be increased to a moving speed V2 (>V).

In the case where the moving speed is increased to the moving speed V2, the moving speed is increased while the amount of blurring is small, so that a period of time required to perform image capturing can be shortened. However, blurring is likely to occur.

As explained so far, the moving speed is corrected according to the blurring amount in a captured image, and the mobile body 11 is controlled on the basis of the corrected moving speed. Accordingly, image capturing can be performed with a suitable quality.

Figure 17:
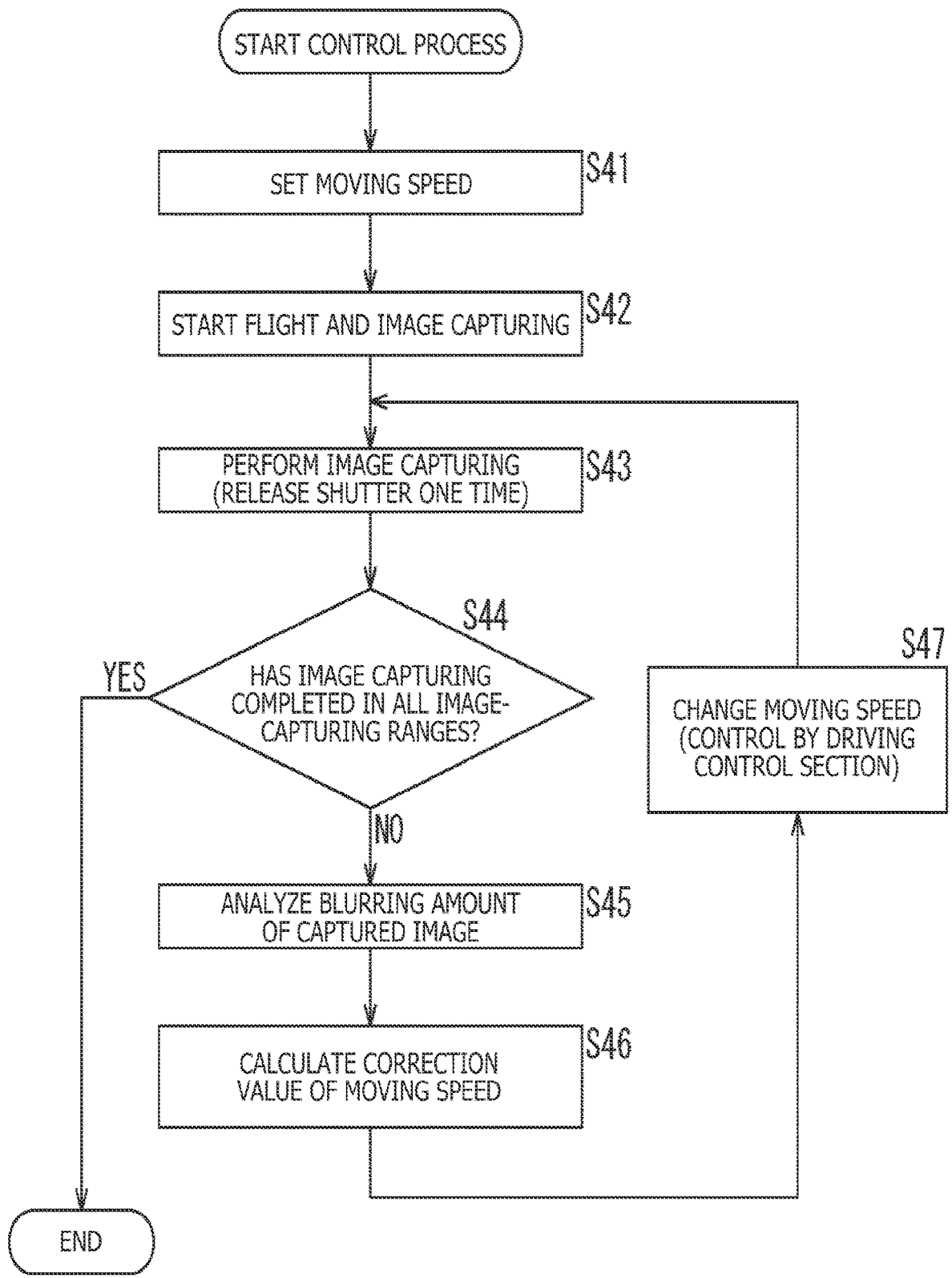
FIG. 17 is a flowchart for explaining a control process in FIGS. 16A and 16B.

Next, the control process in FIGS. 16A and 16B, which is performed by the mobile-body control system 1, will be explained with reference to a flowchart in FIG. 17.

In step S41, the control section 61 sets an image-capturing speed.

In step S42, the driving control section 63 starts flight and image capturing.

In step S43, the image capturing section 21 performs image capturing of one-time shutter. The image capturing section 21 outputs a captured image obtained by the image capturing to the analysis section 64.

In step 44, the control section 61 determines whether or not image capturing is completed in all image-capturing ranges. In a case where incompletion of image capturing in all image-capturing ranges is determined in step S44, the process proceeds to step S45.

In step S45, the analysis section 64 analyzes the blurring amount in the captured image through comparison with a predetermined threshold. The analysis section 64 outputs the analysis result of the blurring amount in the captured image to the control section 61.

In step S46, the control section 61 calculates a correction value for correcting an image-capturing speed, on the basis of the analysis result. The correction value of the image-capturing speed is calculated by use of such a graph as that depicted in FIG. 18.

Figure 18:
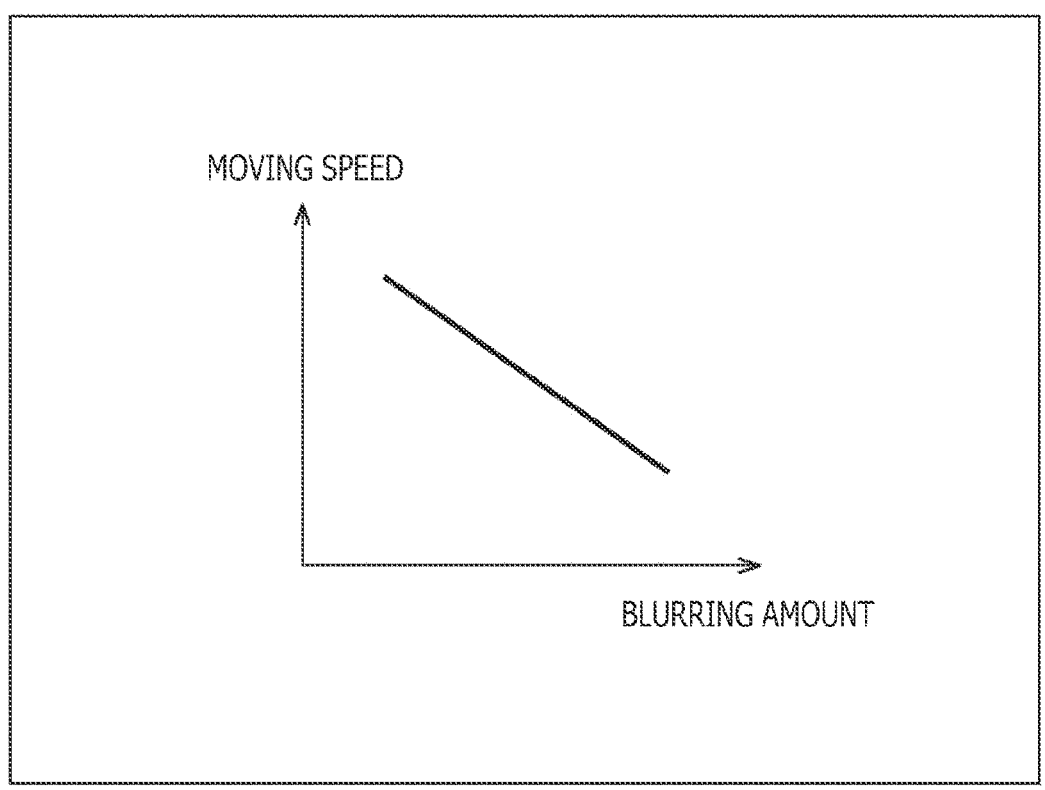
FIG. 18 is a diagram depicting an example of the relation between an image blurring amount and a moving speed.

FIG. 18 depicts the relation between a blurring amount in an image and a moving speed. The moving speed becomes lower with an increase in the blurring amount in a captured image, as depicted in FIG. 18. For example, information indicating a relation preset by a user, such as that depicted in FIG. 18, is stored in the memory of the control section 61.

The control section 61 corrects the moving speed, on the basis of the correction value corresponding to the analysis result of the blurring amount in the captured image, and outputs the corrected moving speed to the driving control section 63.

In step S47, the driving control section 63 changes the moving speed on the basis of the corrected moving speed supplied from the control section 61.

On the other hand, in a case where completion of the image capturing in all image-capturing ranges is determined in step S44, the control process is ended.

<Correction of Image-Capturing Route by Determination on Whether Image Capturing of Captured Image has Succeeded or Failed>

Figure 19A:
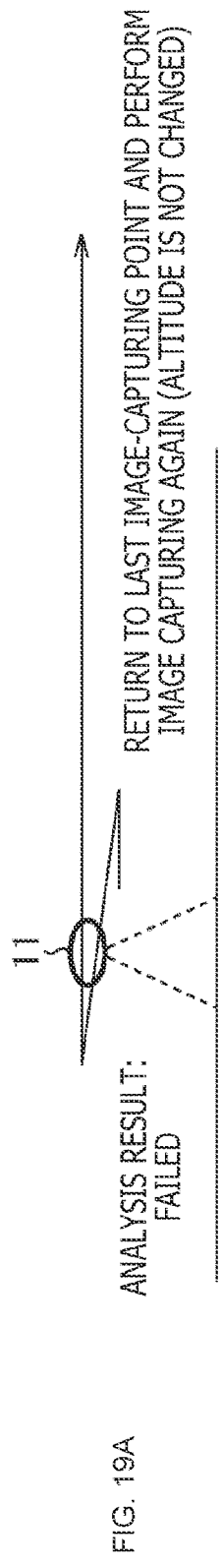
FIGS. 19A and 19B depict diagrams of examples of correcting an image-capturing route by determining whether image capturing of a captured image has succeeded or failed.
Figure 19B:
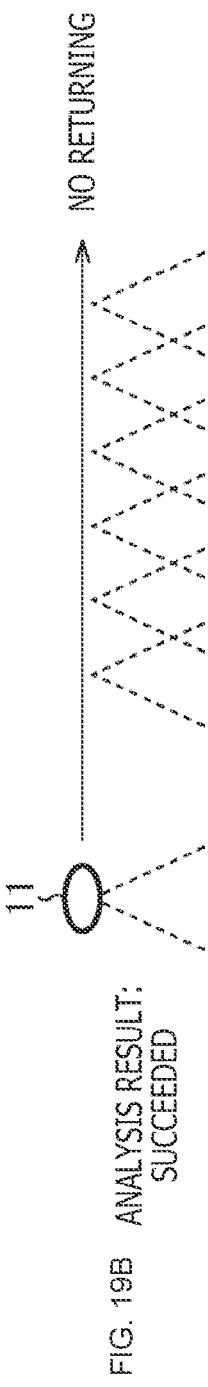

FIGS. 19A and 19B depict diagrams of examples of correcting an image-capturing route by determining whether image capturing of a captured image has succeeded or failed.

In determination on whether image capturing of a captured image has succeeded or failed, a determination result indicating that the image capturing has failed is obtained in a case where the blurring amount in the captured image is greater than a predetermined threshold, for example. In a case where the blurring amount in the captured image is not greater than the predetermined threshold, the determination result indicating that the image capturing has succeeded is obtained.

In a case where a determination result regarding whether image capturing of a captured image has succeeded or failed indicates that the image capturing has failed, as depicted in FIG. 19A, the image-capturing route is corrected such that the mobile body 11 is caused to return to the last image-capturing point to perform image capturing again. In this case, the image-capturing altitude is not changed. It is to be noted that the mobile body 11 may be caused to return to the second last image-capturing point, instead of the last image-capturing point.

On the other hand, in a case where the determination result regarding whether image capturing of a captured image has succeeded or failed indicates that the image capturing has succeeded, as depicted in FIG. 19B, image capturing along the image-capturing route according to the image-capturing conditions is continued.

As explained so far, in a case where a determination result regarding whether image capturing of a captured image has succeeded or failed indicates that the image capturing has failed, an image-capturing route is corrected to control the mobile body 11 to return to the last image-capturing point and perform image capturing again. Accordingly, a period of time required to perform image capturing can be shortened, compared to a conventional case in which image capturing of a point where image capturing has been failed is performed again after image capturing in all ranges is finished.

Figure 20:
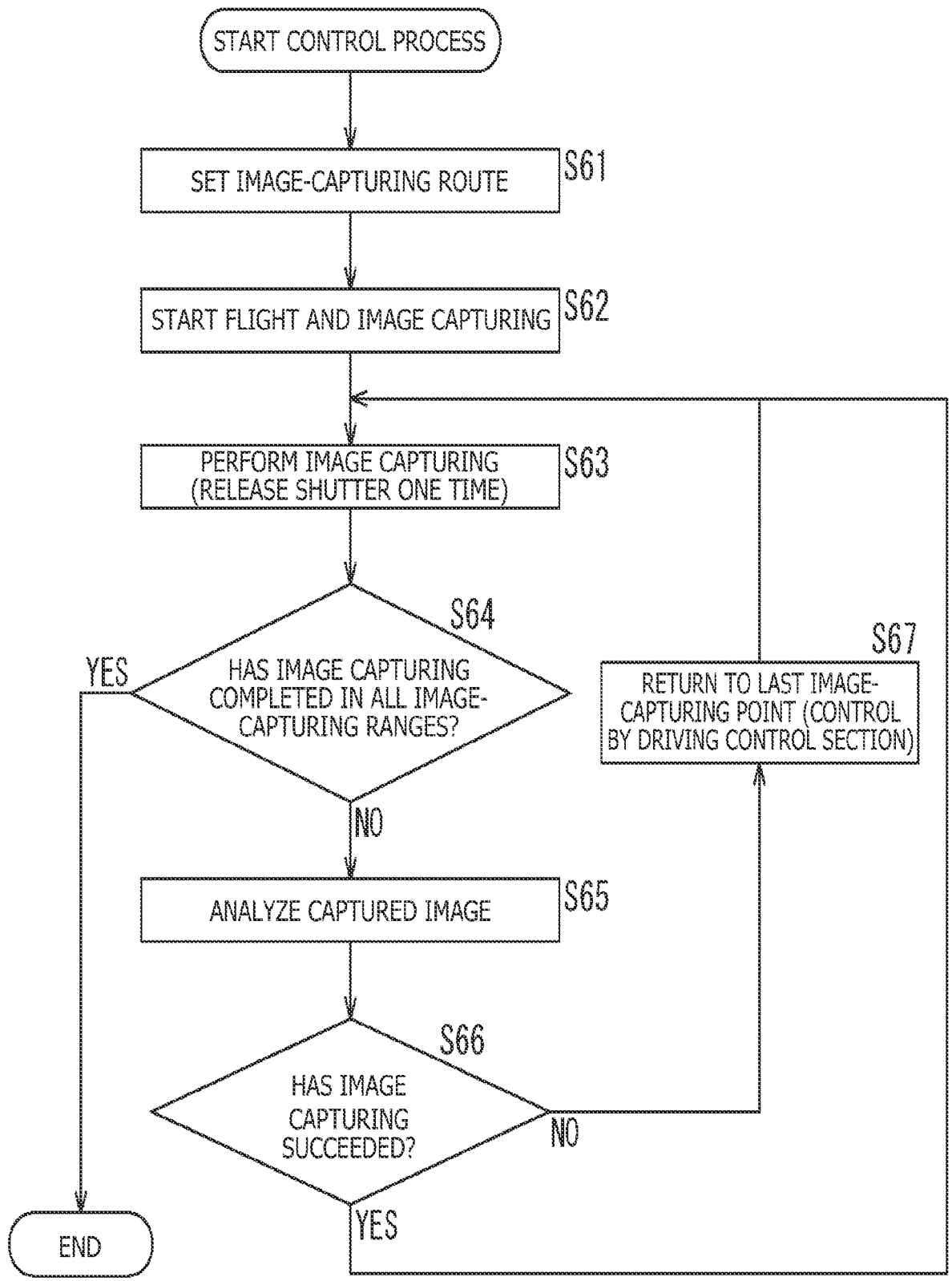
FIG. 20 is a flowchart for explaining a control process in FIGS. 19A and 19B.

Next, the control process in FIGS. 19A and 19B, which is performed by the mobile-body control system 1, will be explained with reference to a flowchart in FIG. 20.

In step S61, the control section 61 sets an image-capturing route.

In step S62, the driving control section 63 starts flight and image capturing.

In step S63, the image capturing section 21 performs image capturing of one-time shutter. The image capturing section 21 outputs a captured image obtained by the image capturing to the analysis section 64.

In step S64, the control section 61 determines whether or not image capturing is completed in all image-capturing ranges. In a case where incompletion of image capturing in all image-capturing ranges is determined in step S64, the process proceeds to step S65.

In step S65, the analysis section 64 analyzes the captured image. The analysis section 64 outputs the analysis result of the captured image to the control section 61.

In step S66, the control section 61 determines whether the image capturing of the captured image has succeeded or failed on the basis of the analysis result. In a case where success of the image capturing is determined in step S66, the process returns to step S63. Then, the following steps are repeated.

In a case where failure of the image capturing is determined in step S66, the process proceeds to step S67.

The control section 61 corrects the image-capturing route which is an image-capturing condition by using an image-capturing route correction value that has been corrected so as to include a route to the last image-capturing point, and outputs the corrected image-capturing route to the driving control section 63.

In step S67, the driving control section 63 changes a destination (image-capturing route) to the last image-capturing point on the basis of the corrected image-capturing route supplied from the control section 61, movement thereto is made, and image capturing is performed.

<Correction of Image-Capturing Altitude by Analysis of Remaining Power>

Figure 21:
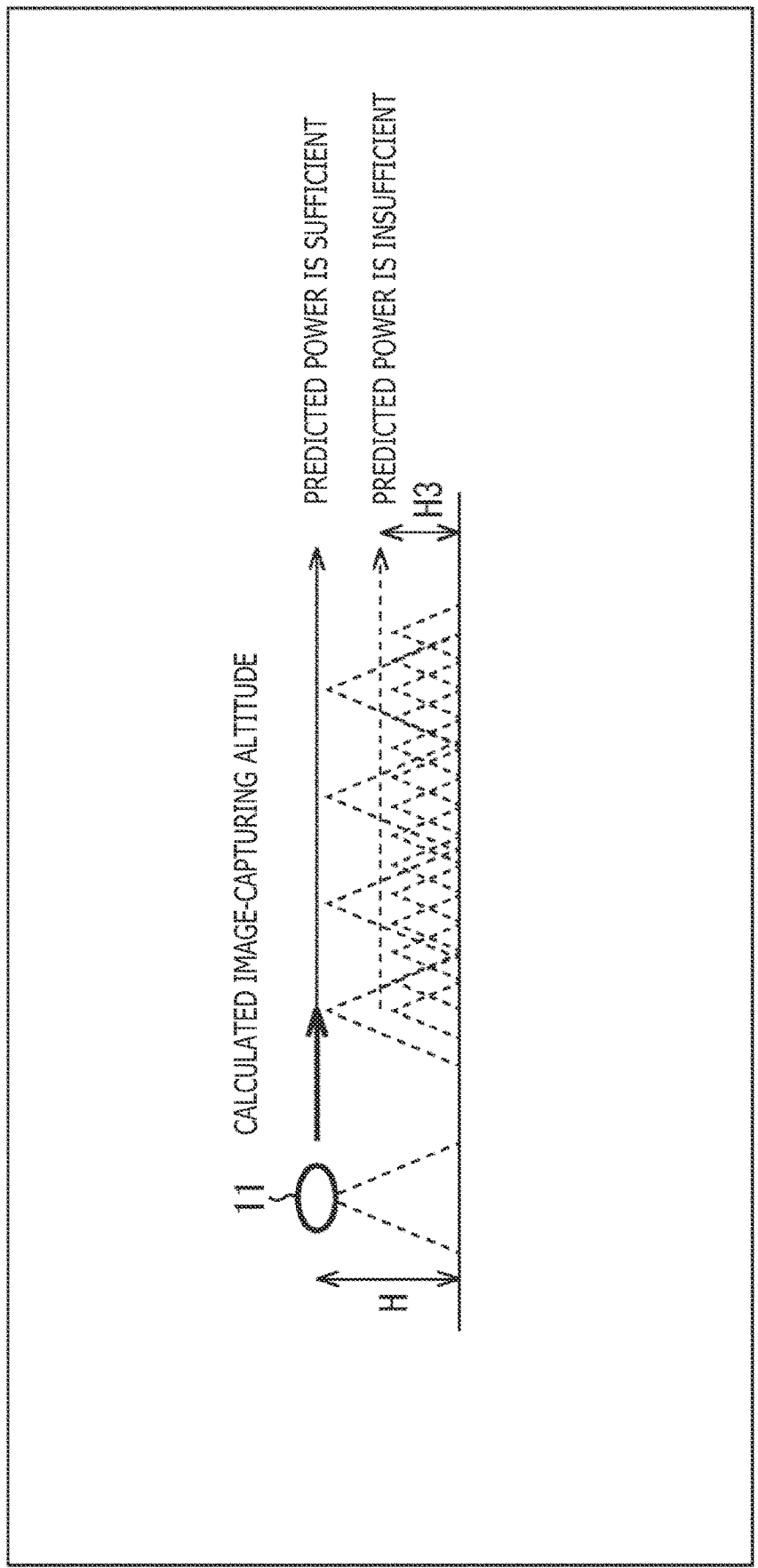
FIG. 21 is a diagram depicting an example of correcting an image-capturing altitude or a moving speed by analyzing the remaining power in the mobile body.

FIG. 21 is a diagram depicting an example of correcting an image-capturing altitude or a moving speed by analyzing the remaining power in the mobile body.

For example, in a case where an analysis result of the band of a captured image illustrates a low band, an image-capturing altitude having a constant value is calculated such that the mobile body 11 continues the movement at an image-capturing altitude H. In a case of changing the image-capturing altitude, a correction value of the image-capturing altitude is calculated.

During this calculation, a remaining power is predicted. When the predication indicates that power will be sufficient until the end of image capturing, control based on the calculated image-capturing altitude is performed. On the other hand, when the prediction indicates that power will become insufficient before the end of image capturing, the image-capturing altitude is modified to an image-capturing altitude, such as an image-capturing altitude H3 (=1/2H), at which less power is consumed than that at the calculated image-capturing altitude.

Similarly, a moving speed is corrected and modified.

As explained so far, an image-capturing altitude or a correction value of an image-capturing altitude is modified on the basis of the remaining power. Accordingly, image capturing can be finished while the remaining power is efficiently used.

Next, the control process in FIG. 21, which is performed by the mobile-body control system 1, will be explained with reference to a flowchart in FIG. 22.

Figure 9:
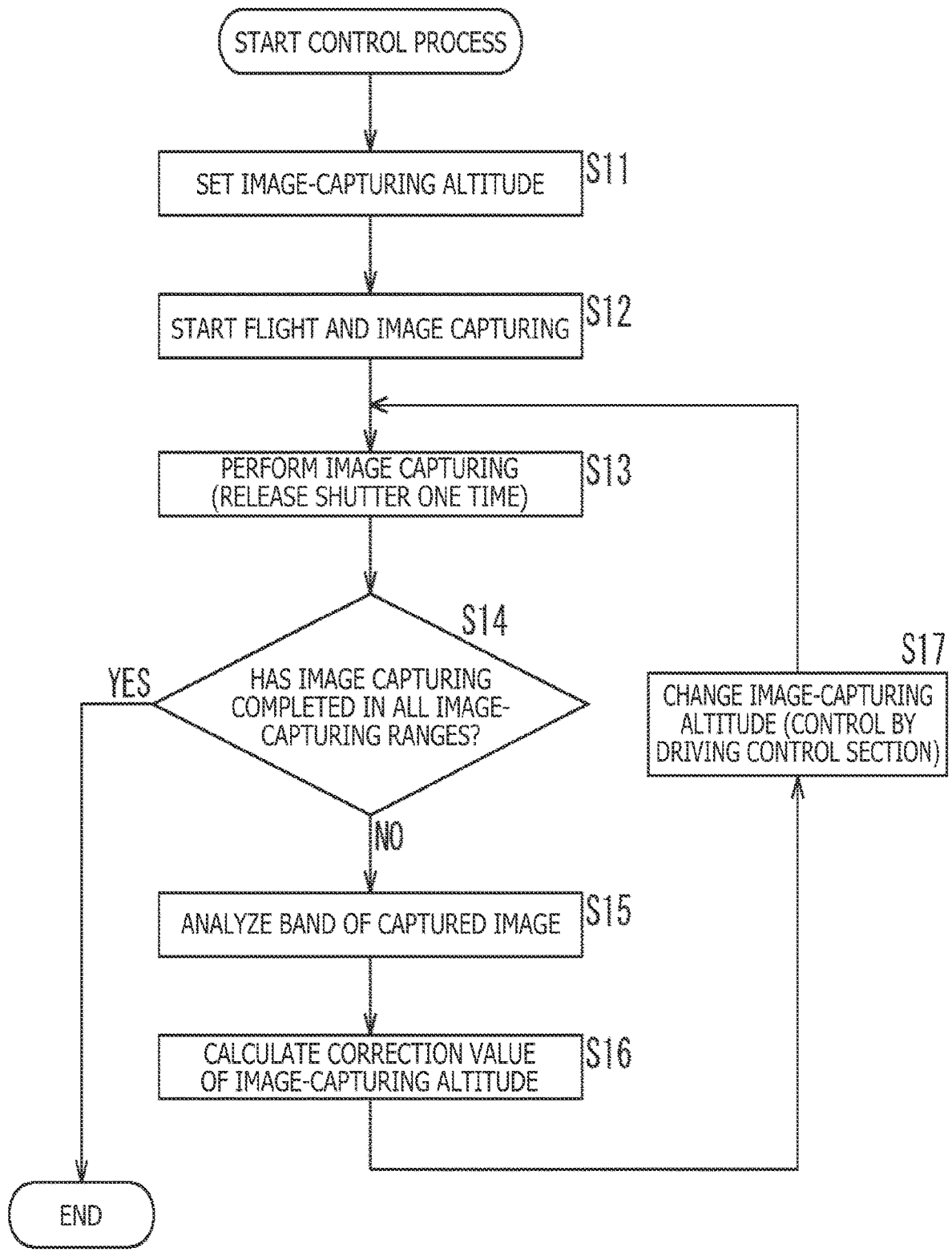
FIG. 9 is a flowchart for explaining a control process in FIGS. 8A and 8B.
Figure 22:
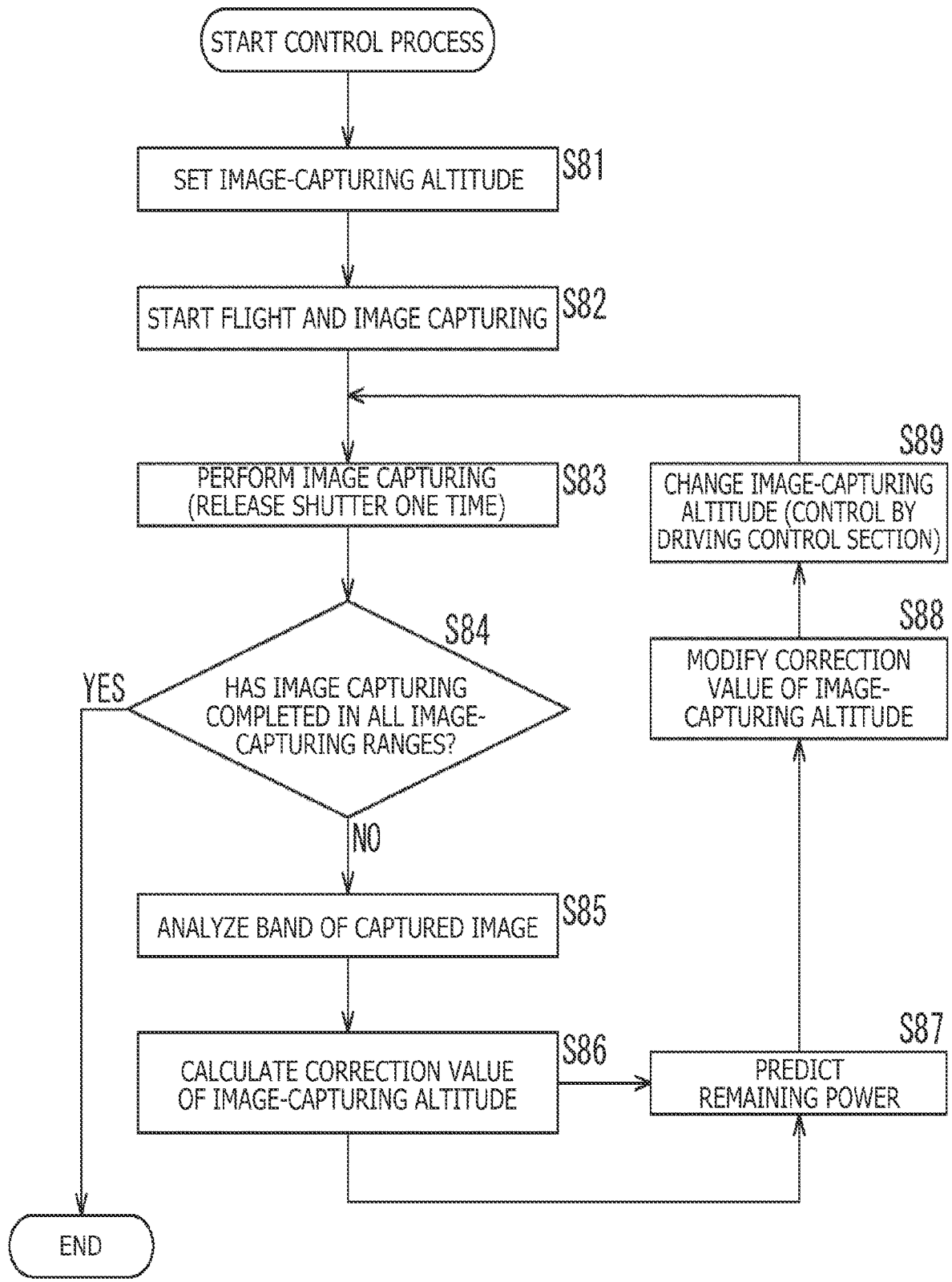
FIG. 22 is a flowchart for explaining a control process in FIG. 21.

It is to be noted that steps S81 to S85 in FIG. 22 are similar to steps S11 to S15 in FIG. 9. An overlapping explanation thereof is omitted, as appropriate.

In step S86, the control section 61 calculates a correction value of an image-capturing altitude on the basis of an analysis result of the band of a captured image. The correction value of the image-capturing altitude is calculated by use of such a graph as that depicted in FIG. 23.

Figure 23:
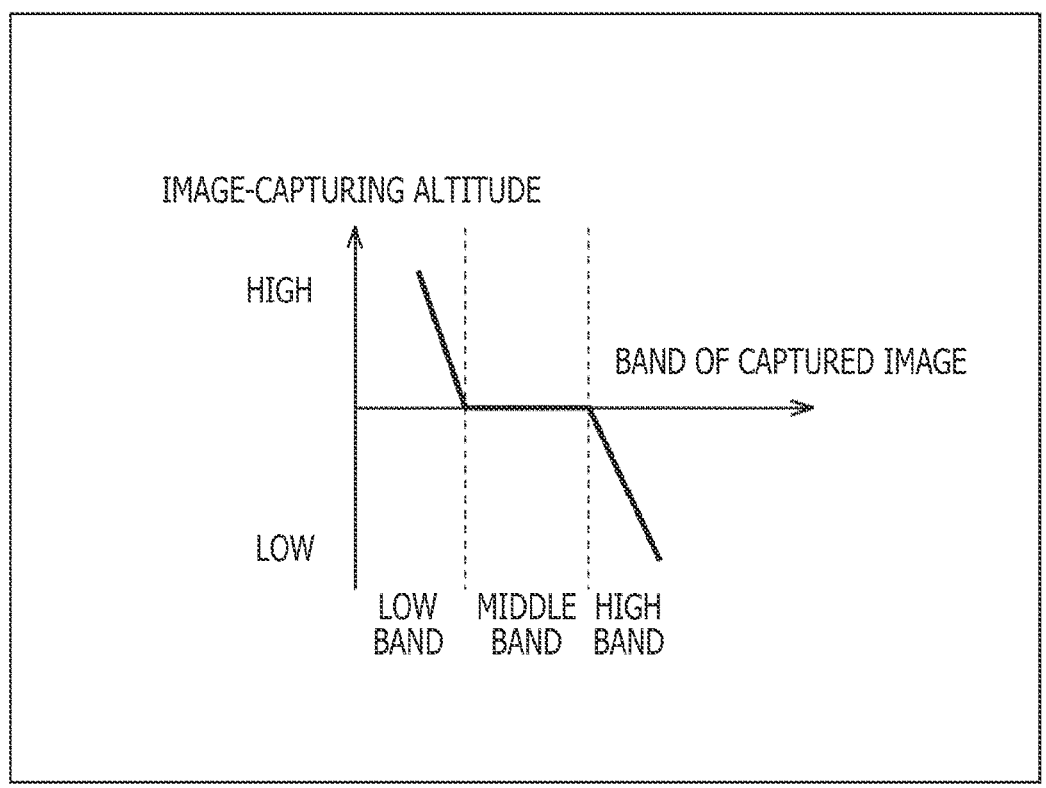
FIG. 23 is a diagram depicting the relation between the band of a captured image and an image-capturing altitude.

FIG. 23 depicts the relation between the band of a captured image and an image-capturing altitude. In the example in FIG. 23, the band of a captured image is classified into three ranges: a low band range; a middle band range; and a high band range. In the low band range, the image-capturing altitude becomes higher as the band becomes lower. In the middle band range, the image-capturing altitude is fixed. In the high band range, the image-capturing altitude becomes lower as the band becomes higher. Information indicating a relation preset by a user, such as that depicted in FIG. 23, is stored in the memory of the control section 61.

In step S87, the control section 61 predicts a remaining power.

In step S88, the control section 61 modifies the correction value of the image-capturing altitude on the basis of the predicted remaining power amount. A correction value of an image-capturing altitude is modified by, for example, a multiplication of the correction value with a modification amount. The modification amount is calculated by use of such a graph as that depicted in FIG. 24.

Figure 24:
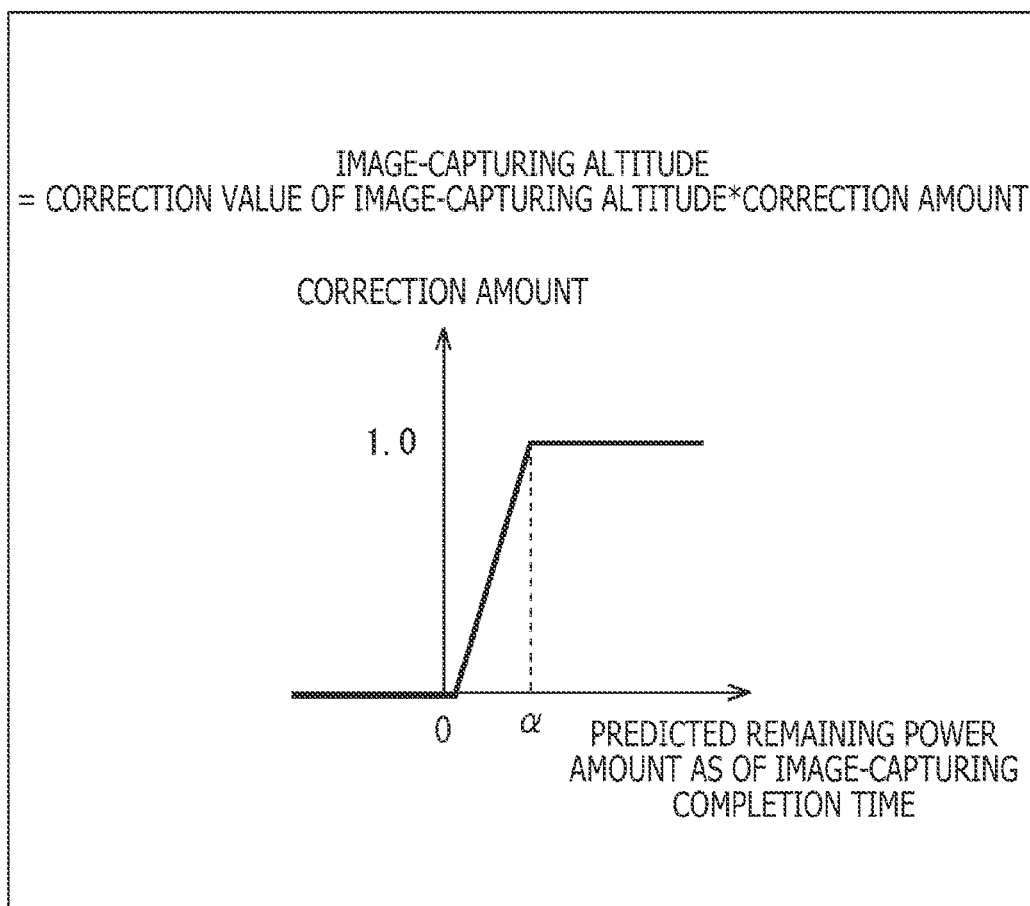
FIG. 24 is a diagram depicting the relation between a predicted remaining power amount as of an image-capturing completion time and a modification amount.

FIG. 24 depicts the relation between a predicted remaining power amount as of an image-capturing completion time and a modification amount.

In a case where the predicted remaining power amount as of the image-capturing completion time is equal to or greater than a value α which represents a predetermined power amount, as depicted in the graph in FIG. 24, the modification amount is set to 1.0. In addition, in a case where the predicted remaining power amount as of the image-capturing completion time is less than the value α, the modification amount is set to be close to 0 according to the predicted remaining power amount. Information indicating such a relation as that depicted in FIG. 24 is stored in the memory of the control section 61.

The control section 61 multiplies, with the modification amount, the correction value of the image-capturing altitude corresponding to the analysis result of the band of the captured image, thereby correcting the image-capturing altitude which is an image-capturing condition. Then, the control section 61 outputs the corrected image-capturing altitude to the driving control section 63.

In step S89, the driving control section 63 changes the image-capturing altitude on the basis of the corrected image-capturing altitude supplied from the control section 61.

On the other hand, in a case where completion of the image capturing in all image-capturing ranges is determined in step S84, the control process is ended.

2. Second Embodiment

The case where the mobile-body control system includes only the mobile body has been explained above. Alternatively, the mobile-body control system may include the mobile body and a control device that includes an analysis section and a control section.

<Example of Mobile-Body Control System Including Mobile Body and Control Device>

Figure 25:
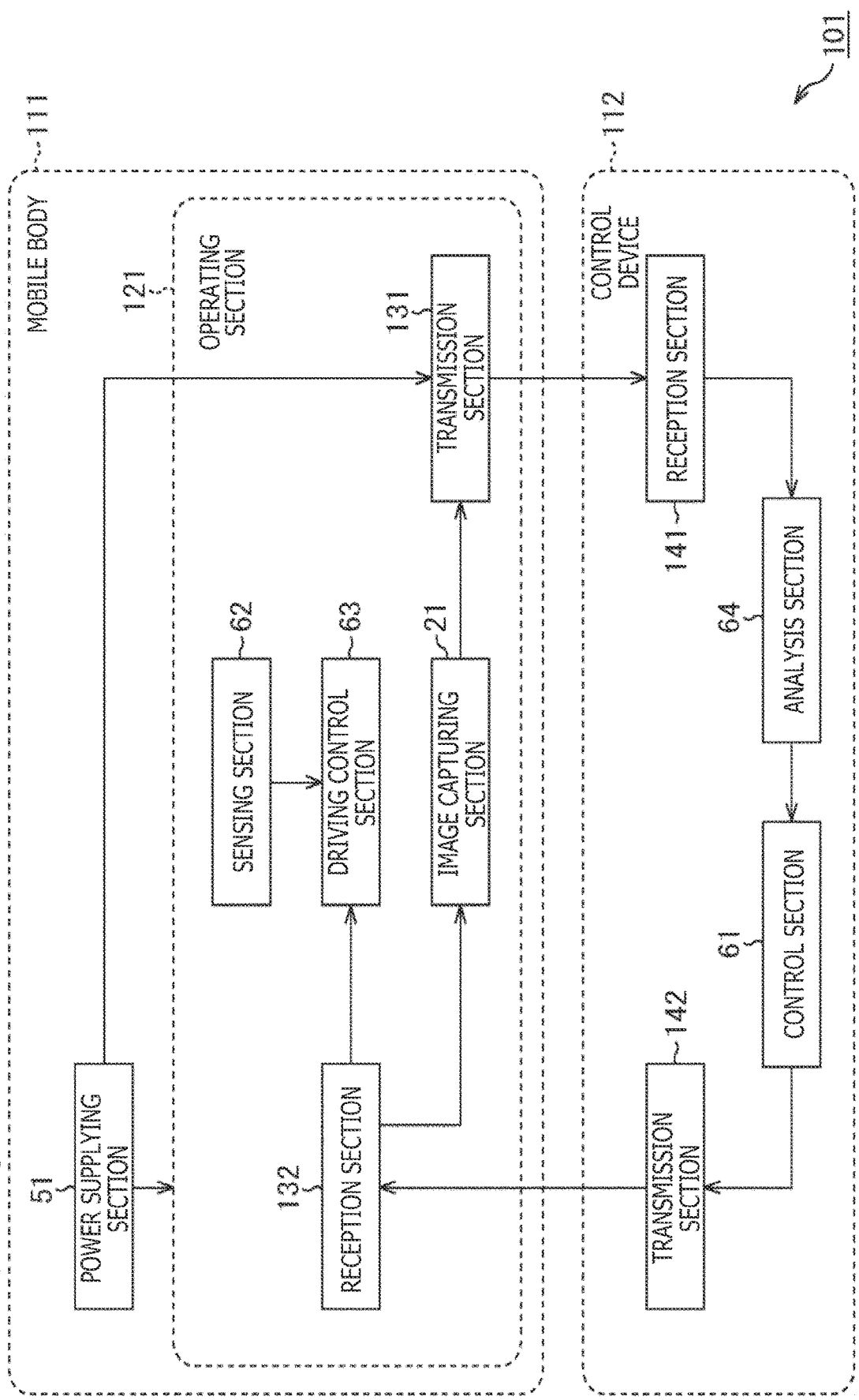
FIG. 25 is a block diagram depicting another example of the mobile-body control system to which the present technique is applied.

FIG. 25 is a block diagram depicting another example of the mobile-body control system to which the present technique is applied.

As depicted in FIG. 25, a mobile-body control system 101 includes a mobile body 111 and a control device 112. It is to be noted that components corresponding to those in FIG. 7 are denoted by the same reference signs.

The configuration of the mobile-body control system 101 in FIG. 25 is different from the configuration in FIG. 7 in that the control section 61 and the analysis section 64 are provided in the control device 112. That is, control of the mobile body is not autonomously performed by the mobile body but performed by the control device 112 which is an external device.

In addition, in the mobile-body control system 101 in FIG. 25, the mobile body 111 and the control device 112 each include a reception section and a transmission section. Image-capturing conditions are transmitted, as needed, between the mobile body 111 and the control device 112 through wireless communication or the like. It is to be noted that a transmission interval of a certain amount may be given, but in such a case, a transmission interval causes a delay, so that the accuracy of the control may be deteriorated.

Specifically, similarly to the mobile body 11 in FIG. 1, the mobile body 111 includes a drone, a robot, a vehicle, a truck, or the like including the image capturing section 21.

The mobile body 111 includes the power supplying section 51 and an operating section 121.

The operating section 121 includes a transmission section 131 and a reception section 132, in addition to the above-mentioned image capturing section 21, the sensing section 62, and the driving control section 63. Each section in the operating section 121 is operated with power supplied from the power supplying section 51.

The transmission section 131 transmits a captured image supplied from the image capturing section 21 and information such as remaining power information supplied from the power supplying section 51, to the control device 112.

The reception section 132 receives image-capturing conditions transmitted from the control device 112 and outputs the image-capturing conditions to the driving control section 63. The reception section 132 receives an image-capturing instruction transmitted from the control device 112 and outputs the image-capturing instruction to the image capturing section 21.

The control device 112 includes a personal computer, a tablet terminal, a smartphone, or the like. The control device 112 includes the control section 61 and the analysis section 64 in FIG. 9, a reception section 141, and a transmission section 142.

The reception section 141 receives a captured image and remaining power information transmitted from the mobile body 111 and outputs the captured image and the remaining power information to the analysis section 64.

The transmission section 142 transmits an image-capturing instruction supplied from the control section 61 and information regarding image-capturing conditions, etc., supplied from the control section 61, to the mobile body 111.

In the mobile-body control system having such a configuration, the control device 112 conducts the abovementioned correction of image-capturing conditions.

<Correction of Image-Capturing Ranges According to Remaining Powers in Two Mobile Bodies>

Figure 26:
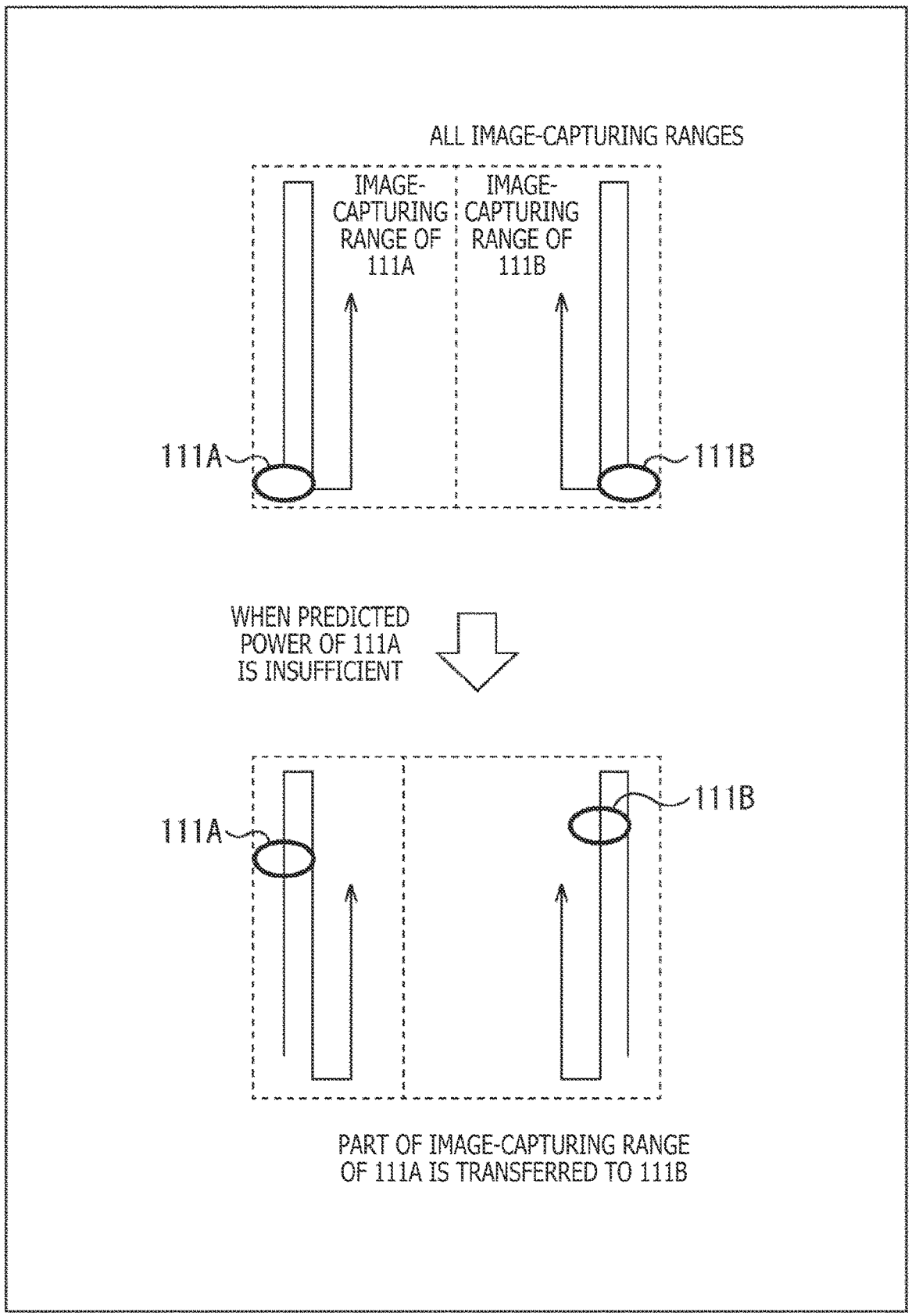
FIG. 26 is a diagram depicting an example of correcting an image-capturing range by analyzing power in each of two mobile bodies.

FIG. 26 is a diagram depicting an example of correcting image-capturing ranges by analyzing respective remaining powers in two mobile bodies.

Image capturing is performed in all image-capturing ranges by two mobile bodies 111A and 111B. The mobile body 111A and the mobile body 111B each have a configuration similar to that of the mobile body 111 in FIG. 25. Under image-capturing conditions prior to image capturing, the size of the image-capturing range of the mobile body 111A is substantially equal to the size of the image-capturing range of the mobile body 111B.

The control device 112 analyzes captured images from the mobile body 111A and the mobile body 111B and calculates a correction value of an image-capturing altitude and a correction value of an image-capturing speed on the basis of the analysis result of the captured images. Moreover, the control device 112 predicts remaining powers as of an image-capturing completion time on the basis of remaining power information from the mobile body 111A and the mobile body 111B.

In a case where the remaining power in the mobile body 111A is insufficient, the control device 112 calculates a correction value of the image-capturing range of the mobile body 111A by partially reducing the image-capturing range, as indicated by a hollow arrow in FIG. 26. The control device 112 corrects the image-capturing range which is an image-capturing condition, by using the calculated correction value of the image-capturing range, and transmits the corrected image-capturing range to the mobile body 111A.

Further, the control device 112 calculates a correction value of the image-capturing range of the mobile body 111B by partially enlarging the image-capturing range. The control device 112 corrects the image-capturing range which is an image-capturing condition, by using the calculated correction value of the image-capturing range, and transmits the corrected image-capturing range to the mobile body 111B.

The image-capturing ranges are corrected such that a part of the image-capturing range of the mobile body 111A is transferred to the mobile body 111B, so that image capturing can be finished while remaining power is efficiently used.

Figure 27:
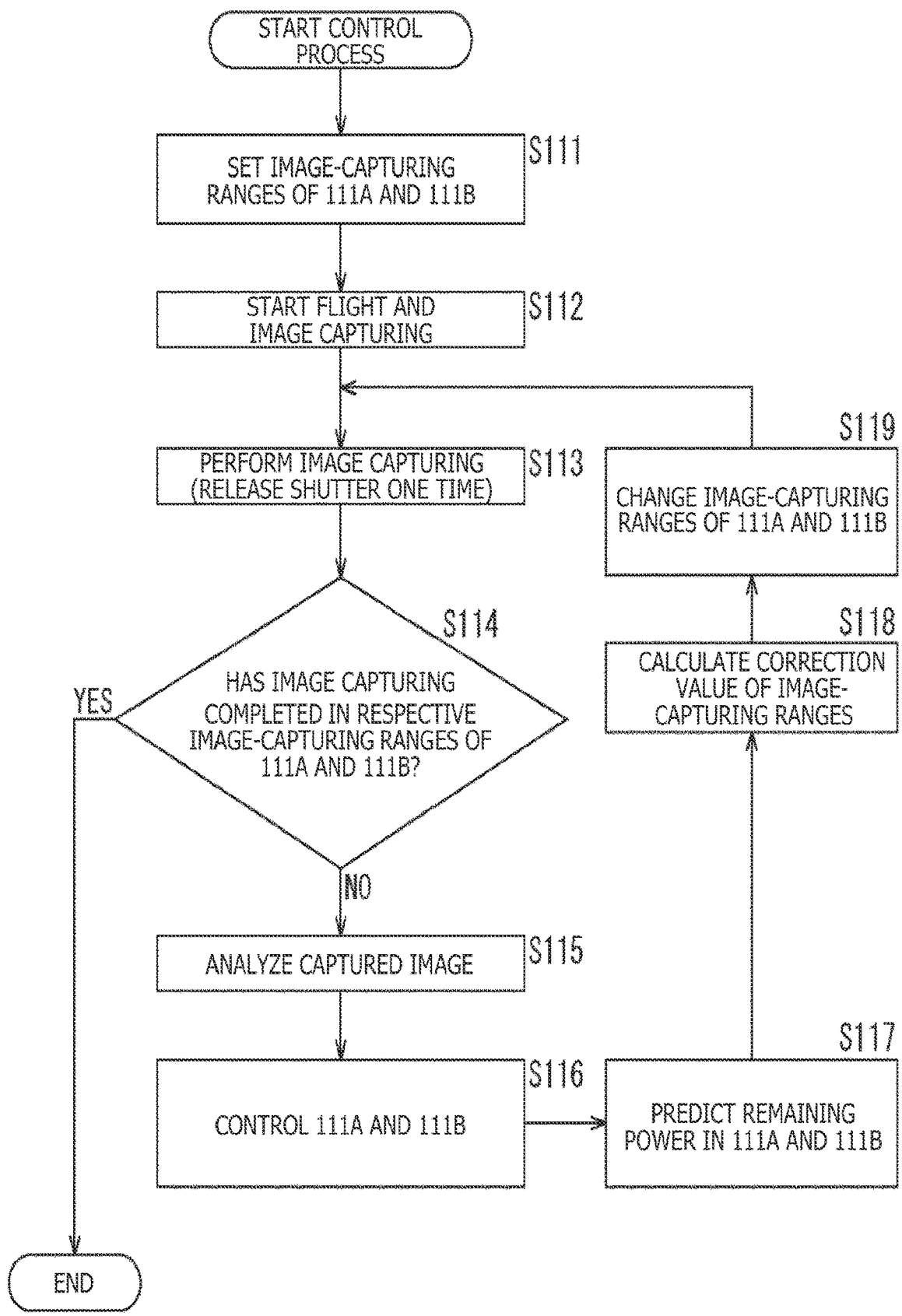
FIG. 27 is a flowchart for explaining a control process in FIG. 26.

Next, the control process in FIG. 26, which is performed by the mobile-body control system 101, will be explained with reference to a flowchart in FIG. 27.

In step S111, the control section 61 sets respective image-capturing ranges of the mobile body 111A and the mobile body 111B.

In step S112, the driving control section 63 starts flight and image capturing.

In step S113, the image capturing section 21 performs image capturing of one-time shutter. The image capturing section 21 outputs a captured image obtained by the image capturing to the analysis section 64.

In step S114, the control section 61 determines whether or not the mobile body 111A and the mobile body 111B has completed image capturing in the corresponding image-capturing ranges. In a case where incompletion of the image capturing in the corresponding image-capturing ranges is determined in step S114, the process proceeds to step S115.

In step S115, the analysis section 64 analyzes the captured images. The analysis section 64 outputs the analysis result of the captured images to the control section 61.

In step S116, the control section 61 controls the mobile body 111A and the mobile body 111B on the basis of the analysis result. For example, among image-capturing conditions, an image-capturing altitude, a moving speed, an overlap amount, etc., are controlled in the abovementioned manner.

In step S117, the control section 61, the control device 112 predicts remaining power on the basis of the remaining power information from the mobile body 111A and the mobile body 111B.

In step S118, the control section 61 calculates a correction value of the image-capturing ranges on the basis of predicted remaining power amounts as information indicating respective predicted remaining powers in the mobile body 111A and the mobile body 111B. The correction value of an image-capturing range is calculated on the basis of an increased/decreased allocation amount of an image-capturing range to the mobile body 111A and the mobile body 111B.

Figure 28:
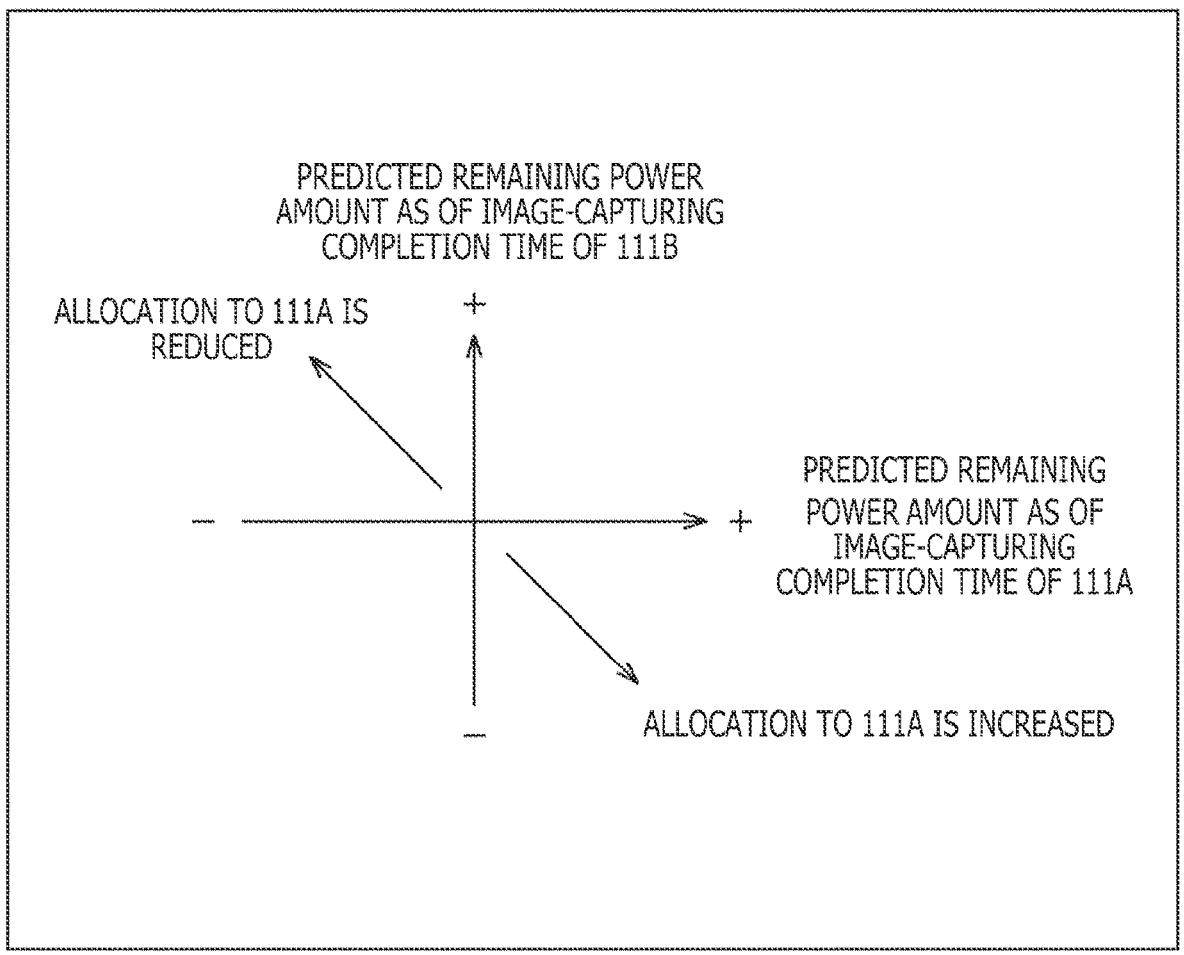
FIG. 28 is a diagram depicting the relation between respective predicted remaining power amounts in two mobile bodies as of an image-capturing completion time.

The increase/decrease amount of the allocations is obtained by a use of such a graph as that depicted in FIG. 28.

FIG. 28 depicts the relation between a predicted remaining power amount of the mobile body 111A as of an image-capturing completion time and a predicted remaining power amount of the mobile body 111B as of an image-capturing completion time.

In a case where the predicted remaining power amount in the mobile body 111A is positive while the predicted remaining power amount in the mobile body 111B is negative, as depicted in FIG. 28, the allocation amount to the mobile body 111A is increased. Also, in a case where the predicted remaining power amount in the mobile body 111A is negative while the predicted remaining power amount in the mobile body 111B is positive, the allocation amount to the mobile body 111A is reduced. Information indicating a relation preset by a user, such as that depicted in FIG. 28, is stored in the memory of the control section 61.

The control section 61 corrects the respective image-capturing ranges, which are image-capturing conditions, of the mobile body 111A and the mobile body 111B, by using the correction value of the image-capturing ranges calculated on the basis of the predicted remaining power amounts.

In step S119, the control section 61 causes the respective driving control sections 63 of the mobile body 111A and the mobile body 111B to change the corresponding image-capturing ranges by transmitting the respective corrected image-capturing ranges to the mobile body 111A and the mobile body 111B.

Subsequently, the process returns to step S113, and the following steps are repeated.

It is to be noted that the example in which the control method in FIG. 26 is performed by the mobile-body control system 101 in FIG. 25 has been explained with reference to FIG. 27, but this control method may be performed by the mobile-body control system 1 in FIG. 1.

Also, the examples in which the respective control methods in FIGS. 8A, 8B, 11A, 11B, 16A, 16B, 19A, 19B, and 21 are performed by the mobile-body control system 1 in FIG. 1 have been explained above. However, these control methods may be performed by the mobile-body control system 101 in FIG. 25.

Further, the above explanation has been given on the premise that a two-dimensional plan image is acquired by the mobile body performing image capturing. However, the present technique is applicable to a case of performing image capturing of a three-dimensional model.

As explained so far, in the present technique, preset image-capturing conditions are corrected on the basis of an analysis result of an image captured by an image capturing device included in the mobile body, and driving of the mobile body is controlled on the basis of the corrected image-capturing conditions.

As a result, it is possible to perform image capturing under optimum image-capturing conditions without performing image capturing again. Moreover, an image having a higher quality can be captured within a short period of time with low power consumption.

3. Computer

<Hardware Configuration Example of Computer>

The abovementioned process series can be executed by hardware or can be executed by software. In the case where the process series is executed by software, a program forming the software is installed into a computer. Here, examples of the computer include a computer incorporated in dedicated-hardware and, for example, a general-purpose personal computer capable of executing various functions by installing various programs thereinto.

Figure 29:
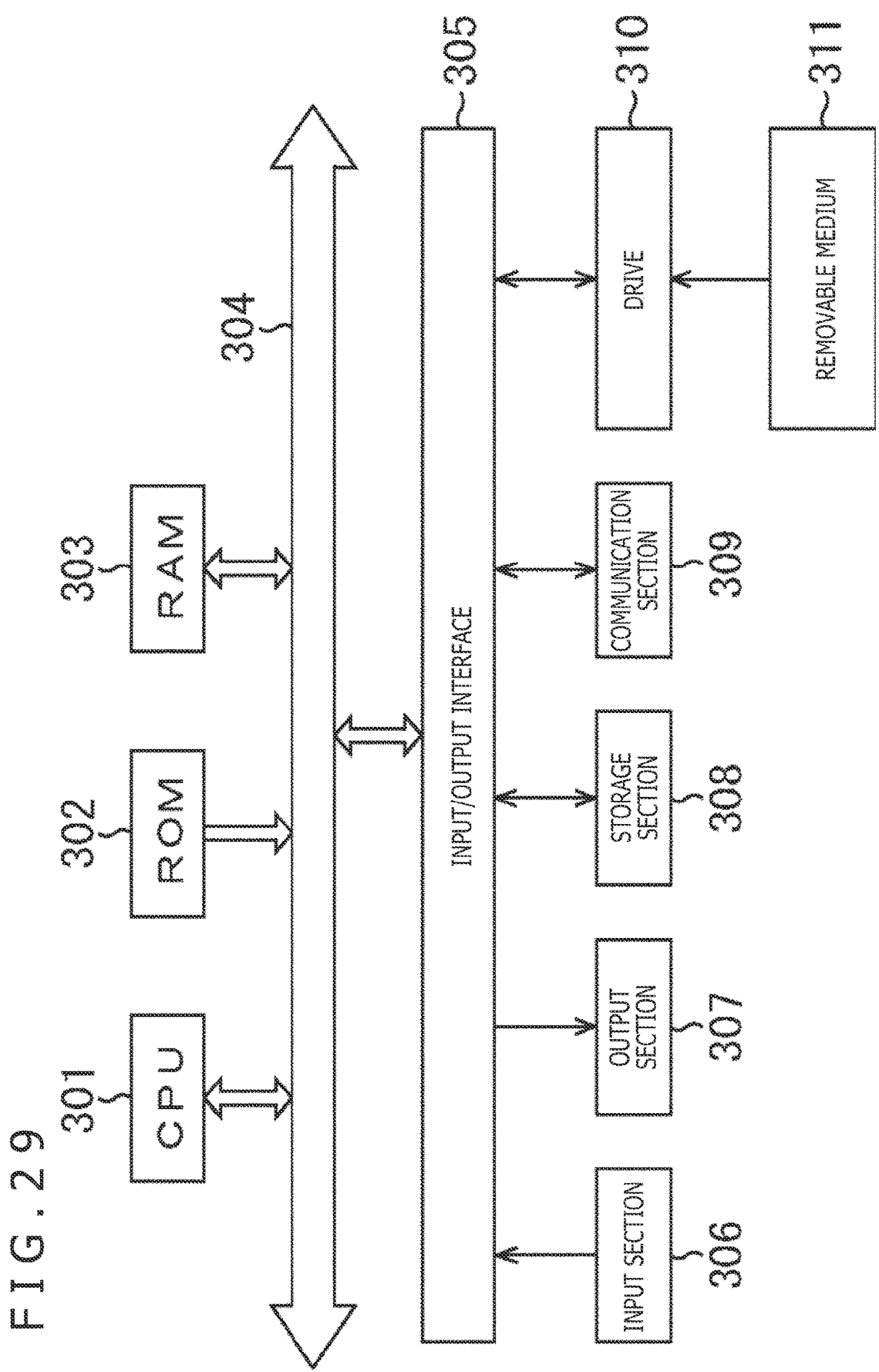
FIG. 29 is a diagram depicting a configuration example of a computer.

FIG. 29 is a block diagram depicting a hardware configuration example of a computer that executes the abovementioned process series on the basis of a program.

In the computer, a CPU (Central Processing UNIT) 301, a ROM (Read Only Memory) 302, and a RAM (Random Access Memory) 303 are mutually connected via a bus 304.

Further, an input/output interface 305 is connected to the bus 304. An input section 306, an output section 307, a storage section 308, a communication section 309, and a drive 310 are connected to the input/output interface 305.

The input section 306 includes a keyboard, a mouse, a microphone, or the like. The output section 307 includes a display, a loudspeaker, or the like. The storage section 308 includes a hard disk, a non-volatile memory, or the like. The communication section 309 includes a network interface or the like. The drive 310 drives a removable medium 311 such as a magnetic disk, an optical disk, a magneto-optical disk, or a semiconductor memory.

In the computer having the above configuration, for example, the CPU 301 loads a program stored in the storage section 308 into the RAM 303 via the input/output interface 305 and the bus 304 and executes the program, so that the abovementioned process series is performed.

The program which is executed by the computer (CPU 301) can be provided by being recorded in the removable medium 311 as a package medium or the like, for example. Also, the program can be provided via a wired or wireless transmission medium such as a local area network, the internet, or digital satellite broadcasting.

In the computer, when the removal medium 311 is attached to the drive 310, the program can be installed into the storage section 308 via the input/output interface 305. Further, the program can be installed into the storage section 308 by being received at the communication section 309 via a wired or wireless transmission medium. Alternatively, the program can be preliminarily installed into the ROM 302 or the storage section 308.

It is to be noted that the program which is executed by the computer may be a program for executing the processes in the time-series order explained herein, or may be a program for executing the processes in parallel or at a necessary timing such as a timing when a call is made.

Further, in the present description, a system means a set of multiple constituent components (devices, modules (components), etc.), and whether or not all the constituent components are included in the same casing does not matter. Therefore, a set of multiple devices that are housed in separate casings and are connected to one another over a network is a system, and further, a single device having multiple modules housed in a single casing is also a system.

It is to be noted that the effects described in the present description are just examples and thus are not limitative. In addition, another effect may be provided.

The embodiments of the present technique are not limited to the abovementioned embodiments, and various changes can be made within the scope of the gist of the present technique.

For example, the present technique can be configured by cloud computing in which one function is shared and cooperatively processed by multiple devices over a network.

Furthermore, the steps explained in each of the abovementioned flowcharts can be executed by a single device or can be executed cooperatively by multiple devices.

Also, in a case where multiple processes are included in one step, the multiple processes included in the one step can be executed by a single device or can be executed cooperatively by multiple devices.

<Combination Examples of Configurations>

The present technique may also have the following configurations.

(1)
  A control device including:
   a control section that corrects a preset image-capturing condition on the basis of an analysis result of an image captured by an image capturing device included in a mobile body; and
   a driving control section that controls driving of the mobile body on the basis of the corrected image-capturing condition.

(2)
  The control device according to (1), further including:
   an analysis section that analyzes the image on a real time basis.

(3)
  The control device according to (1) or (2), in which
   the control section corrects the image-capturing condition on the basis of an analysis result of a frequency component in the image, and the driving control section changes an image-capturing altitude of the mobile body on the basis of the corrected image-capturing condition.

(4)

The control device according to any one of (1) to (3), in which the control section corrects the image-capturing condition on the basis of the analysis result of the frequency component in the image, and the driving control section changes an image-capturing interval of the mobile body on the basis of the corrected image-capturing condition.

(5)

The control device according to (1) or (2), in which the control section corrects the image-capturing condition on the basis of an analysis result of a blurring amount in the image, and the driving control section changes a speed of the mobile body on the basis of the corrected image-capturing condition.

(6)

The control device according to (1) or (2), in which the control section corrects the image-capturing condition on the basis of an analysis result of an analysis regarding whether or not image capturing of the image has succeeded or failed, and the driving control section changes an image-capturing point of the mobile body on the basis of the corrected image-capturing condition.

(7)

The control device according to any one of (1) to (6), in which the control section modifies the corrected image-capturing condition on the basis of an analysis result of a remaining power in the mobile body, and the driving control section changes the image-capturing altitude or the speed of the mobile body on the basis of the modified image-capturing condition.

(8)

The control device according to (1) or (2), in which the control section corrects the image-capturing condition on the basis of an analysis result of remaining powers in a plurality of the mobile bodies, and the driving control section changes image-capturing ranges of the plurality of mobile bodies on the basis of the corrected image-capturing condition.

(9)

A control method including:

by a control device, correcting an image-capturing condition on the basis of an analysis result of an image captured by an image capturing device included in a mobile body; and controlling driving of the mobile body on the basis of the corrected image-capturing condition.

(10)

A program for causing a computer to function as:

a control section that corrects an image-capturing condition on the basis of an analysis result of an image captured by an image capturing device included in a mobile body; and a driving control section that controls driving of the mobile body on the basis of the corrected image-capturing condition.

REFERENCE SIGNS LIST

1 Mobile-body control system, 11 Mobile body, 51 Power supplying section, 52 Operating section, 61 Control section, 62 Sensing section, 63 Driving control section, 64 Analysis section, 101 Mobile-body control system, 111, 111A, 111B Mobile body, 112 Control device, 121 Operating section, 131 Transmission section, 132 Reception section, 141 Reception section, 142 Transmission section

The invention claimed is:

1. A control device comprising:
a control section that corrects a preset image-capturing condition on a basis of an analysis result of at least one of a frequency component, a blurring amount in an image captured by an image capturing device included in a mobile body, and whether or not the image capturing of the image has succeeded or failed; and
a driving control section that controls driving of the mobile body on a basis of the corrected image-capturing condition.

2. The control device according to claim 1, further comprising:
an analysis section that analyzes the image on a real time basis.

3. The control device according to claim 1, wherein
the driving control section changes an image-capturing altitude of the mobile body on the basis of the corrected image-capturing condition.

4. The control device according to claim 1, wherein
the driving control section changes an image-capturing interval of the mobile body on the basis of the corrected image-capturing condition.

5. The control device according to claim 1, wherein
the driving control section changes a speed of the mobile body on the basis of the corrected image-capturing condition.

6. The control device according to claim 1, wherein
the driving control section changes an image-capturing point of the mobile body on the basis of the corrected image-capturing condition.

7. The control device according to claim 1, wherein
the control section modifies the corrected image-capturing condition on a basis of an analysis result of a remaining power in the mobile body, and
the driving control section changes an image-capturing altitude or a speed of the mobile body on a basis of the modified image-capturing condition.

8. The control device according to claim 1, wherein
the control section corrects the image-capturing condition on a basis of an analysis result of remaining powers in a plurality of the mobile bodies, and
the driving control section changes image-capturing ranges of the plurality of mobile bodies on a basis of the corrected image-capturing condition.

9. A control method comprising:
by a control device,
correcting an image-capturing condition on a basis of an analysis result of at least one of a frequency component, a blurring amount in an image captured by an image capturing device included in a mobile body, and whether or not the image capturing of the image has succeeded or failed; and
controlling driving of the mobile body on a basis of the corrected image-capturing condition.

10. A non-transitory computer-readable medium having stored thereon computer-executable instructions that, when executed by an information processing apparatus, cause the information processing apparatus to execute operations, the operations comprising:

a control section that corrects an image-capturing condition on a basis of an analysis result of frequency component in an image captured by an image capturing device included in a mobile body; and a driving control section that controls driving of the mobile body on a basis of the corrected image-capturing condition, wherein the driving control section changes an image-capturing altitude of the mobile body on the basis of the corrected image-capturing condition.

\* \* \* \* \*